(12) United States Patent
Miyamoto et al.

(10) Patent No.: US 7,718,294 B2
(45) Date of Patent: May 18, 2010

(54) FUEL CELL SYSTEM

(75) Inventors: Taisuke Miyamoto, Okazaki (JP);
Mituhiro Satou, Toyota (JP); Nobuo Fujita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 954 days.

(21) Appl. No.: 10/588,604

(22) PCT Filed: Mar. 1, 2005

(86) PCT No.: PCT/JP2005/003834

§ 371 (c)(1),
(2), (4) Date: Aug. 7, 2006

(87) PCT Pub. No.: WO2005/083826

PCT Pub. Date: Sep. 9, 2005

(65) Prior Publication Data

US 2007/0259241 A1    Nov. 8, 2007

(30) Foreign Application Priority Data

Mar. 2, 2004    (JP)    ............................ 2004-058010
Jul. 27, 2004    (JP)    ............................ 2004-218475

(51) Int. Cl.
    *H01M 8/02*    (2006.01)

(52) U.S. Cl. ...................................................... 429/34
(58) Field of Classification Search ..................... 429/34
    See application file for complete search history.

(56) References Cited

U.S. PATENT DOCUMENTS 5,366,818  A  *  11/1994  Wilkinson et al. ............ 429/13

FOREIGN PATENT DOCUMENTS

| JP | 60119081 A | * | 6/1985 |
| JP | A 6-203845 | | 7/1994 |
| JP | A 6-208852 | | 7/1994 |
| JP | A 6-260198 | | 9/1994 |
| JP | A 7-265634 | | 10/1995 |

(Continued)

*Primary Examiner*—Gregg Cantelmo
(74) *Attorney, Agent, or Firm*—Oliff & Berridge, PLC

(57) ABSTRACT

A fuel cell system (1) capable of securely removing moisture in particulate form floating in an exhaust gas passage along with impurities mixed in the moisture, enhancing the performance of a fuel cell, and extending the service life of the fuel cell. The fuel cell system (1) includes a gas circulation system for recirculating and resupplying an exhaust gas to a fuel cell (100). This gas circulation system is equipped with an ion exchange resin member (20) that adsorbs impurity components contained in the moisture particles mixed in the exhaust gas flowing through the gas circulation system. The gas circulation system resupplies fluid that has passed through the ion exchange resin member (20) to the fuel cell (100).

15 Claims, 20 Drawing Sheets

| | FOREIGN PATENT DOCUMENTS | |
|---|---|---|
| JP | A 8-507405 | 8/1996 |
| JP | A 8-298130 | 11/1996 |
| JP | A 11-90153 | 4/1999 |
| JP | A 11-147015 | 6/1999 |
| JP | 2000090948 A * | 3/2000 |
| JP | A 2001-25623 | 1/2001 |
| JP | A 2001-35519 | 2/2001 |
| JP | A 2001-313057 | 11/2001 |
| JP | A 2002-313404 | 10/2002 |
| JP | 2003077520 A * | 3/2003 |
| JP | A 2003-331893 | 11/2003 |
| JP | A 2004-227844 | 8/2004 |
| JP | A 2004-281268 | 10/2004 |
| JP | A 2005-28309 | 2/2005 |
| WO | WO 94/10716 A1 | 5/1994 |
| WO | WO 02/084099 A1 | 10/2002 |

* cited by examiner

WATER DISCHARGE ↓

WATER DISCHARGE

WATER DISCHARGE

WATER DISCHARGE

WATER DISCHARGE

WATER DISCHARGE

WATER DISCHARGE

FUEL CELL SYSTEM

TECHNICAL FIELD

The present invention relates to a fuel cell system. More particularly, this invention relates to a fuel cell system having an exhaust gas passage to allow exhaust gas from a fuel cell to flow through.

BACKGROUND ART

Solid polymer fuel cells that have been in general use until the present are composed of a plurality of cells stacked together. Each cell includes: a membrane electrode assembly (MEA) composed of an electrolyte membrane [which is made of an ion exchange membrane], a fuel electrode (an anode) [which is made of a catalyst layer and a diffusion layer placed on one side of the electrolyte membrane], and an oxidizer electrode (a cathode) [which is made of a catalyst layer and a diffusion layer placed on the other side of the electrolyte membrane], and a separator that forms a fluid passage for supplying a fuel gas (hydrogen) to the fuel electrode, and an oxidizing gas (oxygen [or usually the air]) to the oxidizer electrode.

In a fuel cell system including the fuel cell described above, hydrogen as the fuel gas and water generated by a cell reaction flow through a hydrogen circulation system. Since not all the supplied hydrogen is used for the cell reaction, this fuel cell adopts a circulation system that effectively utilizes that un-reacted hydrogen by supplying it back to the fuel cell. The water generated by the cell reaction is discharged outside. In this type of hydrogen circulation system, a pump is usually mounted in a passage as the circulating power source.

Minute amounts of components dissolving from, for example, piping parts of the fuel cell or the system exist in the water flowing through the hydrogen circulation system. Also, impurities in the air drawn in from the outside may enter the passage, pass through the electrolyte membrane, and be mixed in the hydrogen circulation system. In particular, if metal ions exist in the components dissolving from, for example, piping parts of the fuel cell or the system, there is the possibility that the functions of the fuel cell itself may be degraded and the service life of the fuel cell may be shortened. In addition, the water generated in the fuel cell may become acidic.

A method of using an ion exchange resin has been generally employed as a method for purifying water that flows through a hydrogen circulation system like the one described above. If this fuel cell system is to be mounted on an automobile or similar, an extra loading space is needed. It is also necessary to regularly change the ion exchange resin. Accordingly, downsizing the fuel cell system and extending the cycle for changing the ion exchange resin is necessary.

As an example of a system for purifying water generated inside a fuel cell, using an ion exchange resin, JP-A-8-298130 describes a fuel cell system in which a filter for removing the impurities contained in a fuel gas is placed downstream from a junction with a cathode recycle blower discharge pipe for allowing a gas from a cathode outlet to circulate, thereby removing impurities such as iron molds and salts contained in the cathode gas.

JP-A-2001-313057 suggests a method for manufacturing an ion exchange filter that removes impurities contained in a gas supplied to a fuel electrode and an oxidizer electrode, by treating the surface of a base filter made of polyolefin or polyfluoroolefin to make it hydrophilic, and applying an ion exchange polymer solution to the base filter, and then drying the ion exchange polymer solution applied on the base filter.

JP-A-2002-313404 suggests a solid polymer fuel cell system equipped with an ion removal unit for removing ions contained in water that is generated by a fuel cell and accompanied by an exhaust gas, wherein the ion removal unit is placed, on the side closer to the solid polymer fuel cell, at either a fuel gas exhaust pipe or an oxidizer gas exhaust pipe, or both of them, from which the water generated by the fuel cell is discharged.

Moreover, JP-A-2001-35519 suggests a fuel cell coolant circulation system in which a cartridge-type ion exchanger is provided on a fuel cell coolant circulation line for a fuel cell mounted on a mobile body; two filters are placed opposite to each other in the ion exchanger; and one of the filters is equipped with a porous plate and a spring for applying a force to the porous plate in the direction toward the other filter (in other words, for pressing the porous plate in the axial direction of the cartridge-type ion exchanger). The spring is provided in the flow path of the coolant. Even if the volume of the ion exchange resin changes (particularly if the ion exchange resin contracts) during use, this coolant circulation apparatus can appropriately maintain the ion exchange resin firmly between the filters because the axial-direction pressing means composed of the spring and the porous plate applies pressure to compress the ion exchange resin in the axial direction.

However, the filter provided in the fuel cell system described in JP-A-8-298130 is used to remove impurities such as iron molds and salts contained in the cathode gas, and is not intended to securely remove impurities contained in moisture particles mixed in the cathode gas.

The use of the ion exchange filter obtained by the manufacturing method described in JP-A-2001-313057 in an exhaust gas passage for allowing an exhaust gas from the fuel cell to flow through is not mentioned. No attention is paid to the removal of impurities contained in the moisture particles mixed in the exhaust gas.

Moreover, the ion removal unit provided in the fuel cell system described in JP-A-2002-313404 is used to remove ions contained in the generated water flowing through pipes, and is not intended to remove impurities contained in the moisture particles mixed in the exhaust gas discharged from the fuel cell.

Furthermore, in the fuel cell coolant circulation apparatus described in JP-A-2001-35519, the cartridge-type ion exchanger is provided on the coolant circulation line for the fuel cell. Accordingly, no attention is paid to placement of the cartridge-type ion exchanger in an exhaust gas passage for allowing an exhaust gas from the fuel cell to flow through. In particular, no attention is paid to placement of the cartridge-type ion exchanger in the hydrogen circulation system. Therefore, the fuel cell coolant circulation apparatus is not designed to have the cartridge-type ion exchanger placed at a position in a gas-liquid separator where the ion exchanger would not disturb efficient separation between liquid and gas.

DISCLOSURE OF THE INVENTION

This invention aims to improve the conventional fuel cell systems described above. It is an object of the invention to provide a fuel cell system capable of securely removing moisture particles floating in an exhaust gas passage as well as impurities mixed in the moisture, enhancing the performance of a fuel cell, and extending the service life of the fuel cell.

In order to achieve this object, the invention provides a fuel cell system having an exhaust gas passage for allowing an exhaust gas from a fuel cell to flow through, wherein an impurity removal member for removing impurities contained in moisture particles mixed in the exhaust gas is provided in the exhaust gas passage.

The fuel cell system configured in the above described manner can purify the moisture particles mixed in the exhaust gas flowing through the exhaust gas passage and securely remove the impurities contained in the moisture by using the impurity removal member.

The impurity removal member can be placed in the exhaust gas passage of a hydrogen circulation system for the fuel cell system.

The fuel cell system according to the invention may be configured so that a gas-liquid separator is provided in the exhaust gas passage, and the impurity removal member is placed on the inside wall surface of the gas-liquid separator. In addition to the advantageous effects described above, this configuration makes it easier for the moisture trapped (or adsorbed) by the impurity removal member to dribble over the inside wall of the gas-liquid separator and, therefore, it is possible to remove the moisture more efficiently.

Moreover, the fuel cell system according to the invention may be configured so that a gas-liquid separator is provided in the exhaust gas passage, and the impurity removal member is placed in such a manner that a space is formed between the inside wall surface of the gas-liquid separator and the outside surface of the impurity removal member. Because of this configuration, the area where the fluid entering through a gas-liquid inlet comes into contact with the impurity removal member, that is, the inflow area for the fluid to flow into the impurity removal member can be increased. Therefore, in addition to the advantageous effects described above, it is possible to further reduce pressure loss and further enhance refinement (or purification) efficiency.

The impurity removal member can be configured so that it increases a flow resistance (a resistance caused when a gas passes) the closer it is to a gas outlet of the gas-liquid separator. Because of this configuration, in addition to the advantageous effects described above, it is possible to prevent the gas from flowing intensively around the gas outlet of the gas-liquid separator.

If the impurity removal member is placed inside the gas-liquid separator, a space originally existing in the gas-liquid separator can be used as a loading space to receive the impurity removal member. Therefore, there is no need to increase the size of the fuel cell system in order to install the impurity removal member. Also, only the very minimum components are required to install the impurity removal member and, therefore, it is possible to curb any cost increases.

Furthermore, the fuel cell system according to the invention can be configured so that a gas-liquid separator is provided in the exhaust gas passage, and the impurity removal member is located downstream from the gas-liquid separator. This configuration makes it possible to efficiently and securely remove the moisture that was not removed by the gas-liquid separator, along with the impurities mixed in the moisture.

Also, in the fuel cell system according to the invention, the impurity removal member can be treated to make it water-repellent. This water-repellent treatment makes it possible to more efficiently remove the moisture particles mixed in the exhaust gas flowing through the exhaust gas passage.

The water-repellent treatment may involve, for example, a water-repellent member placed on the outside surface of the impurity removal member. Consequently, the amount of moisture flowing into the impurity removal member can be reduced more efficiently.

The water-repellent treatment may also involve, for example, the impurity removal member put in a container made of a water-repellent member.

Furthermore, the fuel cell system according to the invention may include an accommodating member(s) capable of changing its shape in response to changes in the volume of the impurity removal member. If this configuration including the accommodating member is employed, even if the volume of the impurity removal member changes (due to expansion or contraction) according to the operation state of the fuel cell, the accommodating member can absorb those volume changes. Specifically speaking, even if the impurity removal member contracts, generation of a gap between a housing for the impurity removal member (for example, the inside wall of the gas-liquid separator) and the impurity removal member can be prevented. Accordingly, trouble such as degradation of the impurity removal member's impurity removal effect can be prevented. Also, even if the impurity removal member expands, trouble such as deformation of the housing can be prevented.

It is a matter of course that the accommodating member can change its shape in response to changes (increases) in the volume of the impurity removal member when moisture such as the generated water existing around and inside the impurity removal member gets frozen and expands, causing the impurity removal member to expand accordingly.

By having the accommodating member, a filling ability of an impurity removal material, which is a component of the impurity removal member, can be enhanced and spaces in the impurity removal member can be reduced. Accordingly, even if the impurity removal member is subjected to, for example, vehicle vibrations, any adverse effect on the impurity removal material can be prevented.

The accommodating members may be distributed in the impurity removal member. Because of this configuration, the accommodating members can uniformly absorb almost all changes in the volume of the entire impurity removal member.

The accommodating member may be placed around the outside surface(s) of the impurity removal member. The accommodating member can uniformly absorb almost all changes in the volume of the entire impurity removal member when the accommodating member is placed in the manner described above. In this configuration, a plurality of accommodating members may also be distributed in the impurity removal member.

There are no particular limitations on the material and shape of the accommodating member, as long as it does not impair the performance of the fuel cell system and can change its shape in response to changes in the volume of the impurity removal member. The accommodating member can be made of, for example, a porous material. If the accommodating member is made of a porous material, interruption of a gas flow in the gas-liquid separator can be prevented. Moreover, it is possible to make the porous material temporarily hold (or be impregnated with) a liquid, let the held liquid dribble down, and drain the liquid efficiently. Accordingly, the gas-liquid separation function can further be enhanced. It is also possible to prevent the occurrence of trouble caused by collisions of the porous material with the impurity removal member.

Furthermore, the fuel cell system according to the invention can be configured so that the impurity removal member is provided inside the gas-liquid separator, and the accommodating member includes an elastic member and is located at a position outside the gas-liquid flow path of the gas-liquid separator. Since in the above-described configuration the accommodating member is located at a position outside the gas-liquid flow path of the gas-liquid separator, interruption of the gas flow or the liquid dropping can be prevented. This elastic member can accommodate by means of elasticity. There are no particular limitations on the type of the elastic member, as long as it does not interfere with the fuel cell system and has an elastic function; and an example of the elastic member is a spring member.

Moreover, the impurity removal member can be composed of an ion exchange resin member including an ion exchange resin. The impurity removal member may be a foreign substance removal filter for removing foreign substances.

If the impurity removal member is an ion exchange resin member and the ion exchange resin member is employed in a fuel cell system equipped with a gas circulation system for recycling an exhaust gas and supplying it to a fuel cell, the invention provides the following fuel cell system.

Namely, the invention provides a fuel cell system equipped with a gas circulation system for recycling an exhaust gas and supplying it to a fuel cell, wherein an ion exchange resin member for adsorbing impurities contained in moisture particles mixed in the exhaust gas flowing through the gas circulation system is mounted in the gas circulation system, and the fluid that has passed through the ion exchange resin member is resupplied to the fuel cell. The gas circulation system may be a hydrogen circulation system or an oxygen circulation system. The ion exchange resin member may be placed in both the hydrogen circulation system and the oxygen circulation system.

The fuel cell system configured in the above-described manner can purify the moisture particles mixed in the exhaust gas flowing through the gas circulation system and securely remove the impurity components contained in the moisture, by using the ion exchange resin member.

Moreover, the fuel cell system according to the invention can be configured so that the gas circulation system includes a gas-liquid separator, and the ion exchange resin member is placed on the inside wall surface of the gas-liquid separator. In addition to the advantageous effects described above, this configuration makes it easier for the moisture trapped (or adsorbed) by the ion exchange resin member to dribble over the inside wall of the gas-liquid separator and, therefore, it is possible to remove the moisture more efficiently.

Moreover, the fuel cell system according to the invention may be configured so that the gas circulation system includes a gas-liquid separator, and the ion exchange resin member is placed in such a way that a space is formed between the inside wall surface of the gas-liquid separator and the outside surface of the ion exchange resin member. Because of this configuration, the area where the fluid entering through a gas-liquid inlet comes into contact with the ion exchange resin member, that is, the inflow area for the fluid to flow onto the ion exchange resin member can be increased. Therefore, in addition to the advantageous effects described above, it is possible to further reduce pressure loss and further enhance refinement (or purification) efficiency.

The ion exchange resin member can be configured so that it increases a flow resistance (resistance caused when a gas passes) the closer it is to a gas outlet of the gas-liquid separator. Because of this configuration, in addition to the advantageous effects described above, it is possible to prevent the gas from flowing intensively around the gas outlet of the gas-liquid separator.

If the ion exchange resin member is placed inside the gas-liquid separator, a space originally existing in the gas-liquid separator can be used as a loading space to receive the ion exchange resin member. Therefore, there is no need to increase the size of the fuel cell system in order to install the ion exchange resin member. Also, only the very minimum components are required to install the ion exchange resin member and, therefore, it is possible to curb any cost increases.

Furthermore, the fuel cell system according to the invention can be configured so that the gas circulation system includes a gas-liquid separator, and the ion exchange resin member is located downstream from the gas-liquid separator. This configuration makes it possible to efficiently and securely remove the moisture that was not removed by the gas-liquid separator, along with the impurities mixed in the moisture.

Also, in the fuel cell system according to the invention, the ion exchange resin member can be treated to make it water-repellent. This water-repellent treatment makes it possible to more efficiently remove the moisture particles mixed in the exhaust gas flowing through the gas circulation system.

The water-repellent treatment may involve, for example, a water-repellent member placed on the outside surface of the ion exchange resin member. Consequently, the amount of moisture flowing into the ion exchange resin member can be reduced more efficiently.

The water-repellent treatment may also involve, for example, the ion exchange resin member put in a container made of a water-repellent member.

BEST MODE FOR IMPLEMENTING THE INVENTION

Preferred embodiments of this invention will be described below in detail with reference to the attached drawings. The embodiments described below are for the purpose of describing this invention, but the invention is not limited only to these embodiments. Accordingly, this invention can be implemented in various ways unless the utilizations depart from the gist of the invention.

Figure 1:
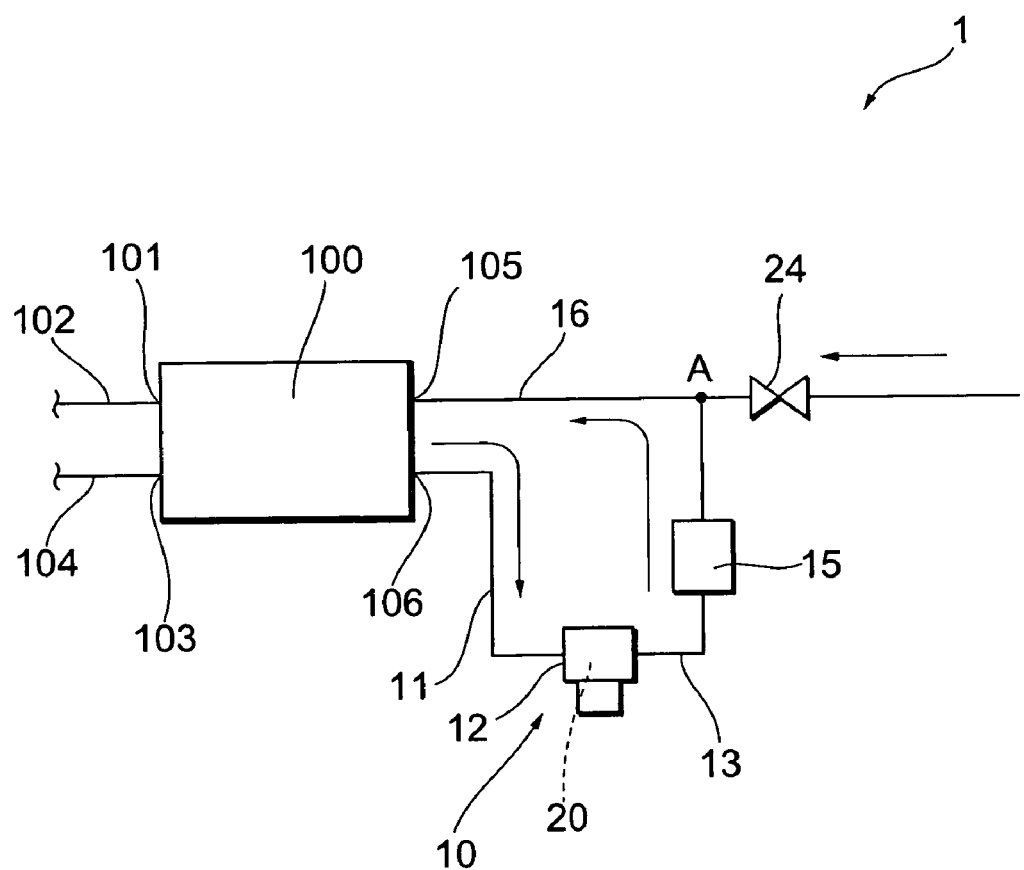
FIG. 1 is a schematic configuration diagram of a fuel cell system according to an embodiment of the invention.
Figure 2:
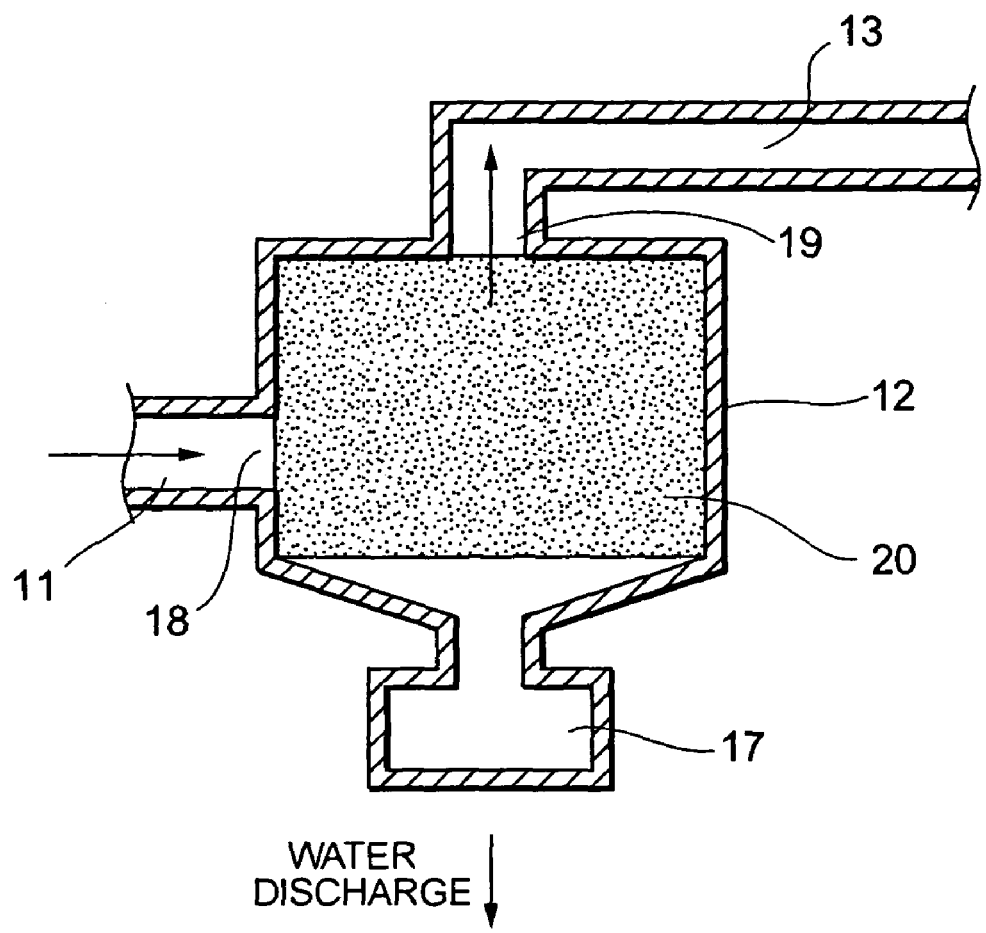
FIG. 2 is an enlarged cross-sectional view schematically showing the configuration of the area around a gas-liquid separator and an ion exchange resin member of the fuel cell system in FIG. 1.

FIG. 1 is a schematic configuration diagram of a fuel cell system according to an embodiment of the invention. FIG. 2 is an enlarged cross-sectional view schematically showing the configuration of the area around a gas-liquid separator and an ion exchange resin member of the fuel cell system in FIG. 1.

In this embodiment, a circulation passage provided in a hydrogen circulation system will be described as an example of an exhaust gas passage connected to a fuel cell to allow an exhaust gas from the fuel cell to flow through.

As shown in FIG. 1, a fuel cell 100 of a fuel cell system 1 according to this embodiment is configured in such a way that it contains a stack made of a plurality of cells. Each cell is constructed by laying an MEA and a separator, one over the other; wherein the separator forms a passage for supplying a fuel gas to a fuel electrode (or anode), and an oxidizing gas (oxygen [usually the air]) to an oxidizer electrode (or cathode).

An air supply port 101 of this fuel cell 100 is connected to an air supply passage 102 for supplying air as an oxidizing gas, while an air exhaust port 103 is connected to an air exhaust passage 104 for exhausting the air and water discharged from the fuel cell 100. A hydrogen supply port 105 of the fuel cell 100 is connected to one end of a hydrogen circulation system 10, while a hydrogen exhaust port 106 is connected to the other end of the hydrogen circulation system 10.

Receiving un-reacted hydrogen and the generated water discharged from the fuel cell 100, the hydrogen circulation system 10 circulates the un-reacted hydrogen and resupplies it together with new hydrogen to the fuel cell 100, and discharges the generated water. This hydrogen circulation system 10 includes: a circulation passage 11 whose one end is connected to the hydrogen exhaust port 106; a gas-liquid separator 12 that is connected to the other end of the circulation passage 11 and separates the hydrogen from water introduced from the circulation passage 11; a circulation passage 13 that is connected to the gas-liquid separator 12, and to which the gas discharged from the gas-liquid separator 12 is introduced; a circulating pump 15 that is connected to a position downstream from the circulation passage 13 and works as a circulating power source for the hydrogen circulation system 10; and a hydrogen supply passage 16 whose one end is connected to the hydrogen supply port 105 to supply hydrogen to the fuel cell 100, and whose the other end is connected to the downstream end of the circulation passage 13 at junction A. Reference numeral 24 indicates a valve for adjusting hydrogen pressure when supplying hydrogen to the fuel cell 100.

Specifically as shown in FIG. 2, the gas-liquid separator 12 has a hollow body formed in a generally cylindrical shape; and a gas-liquid inlet 18 for introducing the hydrogen and water discharged from the circulation passage 11, and a gas outlet 19 for discharging the gas separated in the gas-liquid separator 12. This gas-liquid separator 12 separates a gas-liquid mixture (fluid) introduced through the gas-liquid inlet 18 into a gas and a liquid by swirling the gas-liquid mixture.

A water exhaust port 17 for receiving and discharging the water separated by the gas-liquid separator 12 is formed at a lower part of the gas-liquid separator 12. This water exhaust port 17 is equipped with a drain valve (not shown) configured to discharge only the water separated by the gas-liquid separator 12, without discharging hydrogen.

Moreover, an ion exchange resin member 20 is placed inside the gas-liquid separator 12. This ion exchange resin member 20 contains a cation exchange resin and an anion exchange resin, and is placed in contact with the inside wall of the gas-liquid separator 12 in such a manner that the ion exchange resin member 20 almost completely fills the inside space of the gas-liquid separator 12. Consequently, the gas introduced through the gas-liquid inlet 18 and separated from liquid in the gas-liquid mixture passes through the ion exchange resin member 20, and is then discharged through the gas outlet 19 to the circulation passage 13.

The ion exchange resin, the component of the ion exchange resin member 20, is usually in particulate form, but a resin in fibrous form can also be used. In this embodiment, the ion exchange resin is put in a resin case with openings (not shown) when placed in the gas-liquid separator 12 so that it will not be blown away by a vortex flow generated in the gas-liquid separator 12.

When hydrogen and air are supplied to the fuel cell 100 of the fuel cell system 1 having the configuration described above, they start the following electric reactions:

reaction at the fuel electrode (anode)

$$H_2 \rightarrow 2H^+ + 2e^-;$$

reaction at the oxidizer electrode (cathode)

$$(\tfrac{1}{2})O_2 + 2H^+ + 2e^- \rightarrow H_2O;\ \text{and}$$

reaction in the fuel cell in its entirety $$H_2 + (\tfrac{1}{2})O_2 \rightarrow H_2O.$$

Because of these electric reactions, the un-reacted hydrogen as well as the generated water is discharged at the fuel electrode (anode) through the hydrogen exhaust port 106 to the circulation passage 11.

The generated water and the un-reacted hydrogen discharged to the circulation passage 11 are moved by the power of the circulating pump 15 to the gas-liquid separator 12, where the generated water and the un-reacted hydrogen are separated into hydrogen and water. When this happens, about 90% of the water discharged from the circulation passage 11 is separated from the hydrogen and received by the water exhaust port 17, from which the water is discharged. However, it is difficult to remove the moisture particles floating in the flow of hydrogen and the impurity components contained in the moisture. Therefore, the moisture particles and the impurity components reach the ion exchange resin member 20.

Subsequently, the moisture particles and the impurity components that have reached the ion exchange resin member 20 are trapped there. The moisture particles trapped by the ion exchange resin member 20 dribble down the inside wall of the gas-liquid separator 12 and are then received by the water exhaust port 17. Also, part of the impurity components contained in the moisture is received together with the moisture by the water exhaust port 17, and the remaining impurity components are adsorbed by the ion exchange resin member 20. On the other hand, hydrogen passes through the ion exchange resin member 20 and moves downstream through the circulation passage 13.

As described above, the fuel cell system 1 according to this embodiment can remove almost 100% of the water and impurities generated from the fuel cell 100 by having the ion exchange resin member 20.

In conventional cases, minute amounts of materials and their components dissolve from parts of the fuel cell and piping parts of the circulation passage that come into contact with the water generated by the cell reaction of the fuel cell. Also, impurity components may be introduced via the air drawn in from the outside air, pass through the electrolyte membrane, and enter the hydrogen circulation system 10. These fouling components flow into the fuel cell again. In particular, if ionic substances exist in the fouling components, since the electrolyte membrane (polymer material) is an ion exchange membrane, the electrolyte membrane may adsorb the ion substances or cause unexpected reactions and, therefore, the service life of the electrolyte membrane may be shortened. Moreover, since the hydrogen molecules are dissociated into atoms, there is the possibility that a platinum catalyst mounted on the surface of the electrolyte membrane may be adversely affected. Furthermore, the water generated inside the fuel cell may become acidic.

As described above, the fuel cell system 1 according to this embodiment can have the ion exchange resin member 20 securely trap and remove the moisture particles and the impurity components floating in the hydrogen circulation system.

Accordingly, it is possible to prevent the generated water and the impurity components from flowing into the fuel cell 100 again, enhance the performance of the fuel cell 100, and extend the service life of the fuel cell 100.

Moreover, since the ion exchange resin member 20 is placed inside the gas-liquid separator 12, that is, since the space originally existing in the gas-liquid separator 12 is used as a space for the ion exchange resin member 20, there is no need to increase the size of the fuel cell system 1 in order to install the ion exchange resin member 20. Also, only the very minimum components are required to install the ion exchange resin member 20 and, therefore, it is possible to curb any cost increases.

This embodiment described the case where the ion exchange resin member 20 is placed in contact with the inside wall of the gas-liquid separator 12 so that it almost completely fills the inside space of the gas-liquid separator 12. However, there are no particular limitations on the position and the size of the ion exchange resin member 20, as long as the ion exchange resin member 20 can adsorb the impurity components contained in the moisture particles mixed in the exhaust gas flowing through the gas circulation system, and the gas that has passed through the ion exchange resin member 20 can be resupplied to the fuel cell 100.

Figure 3:
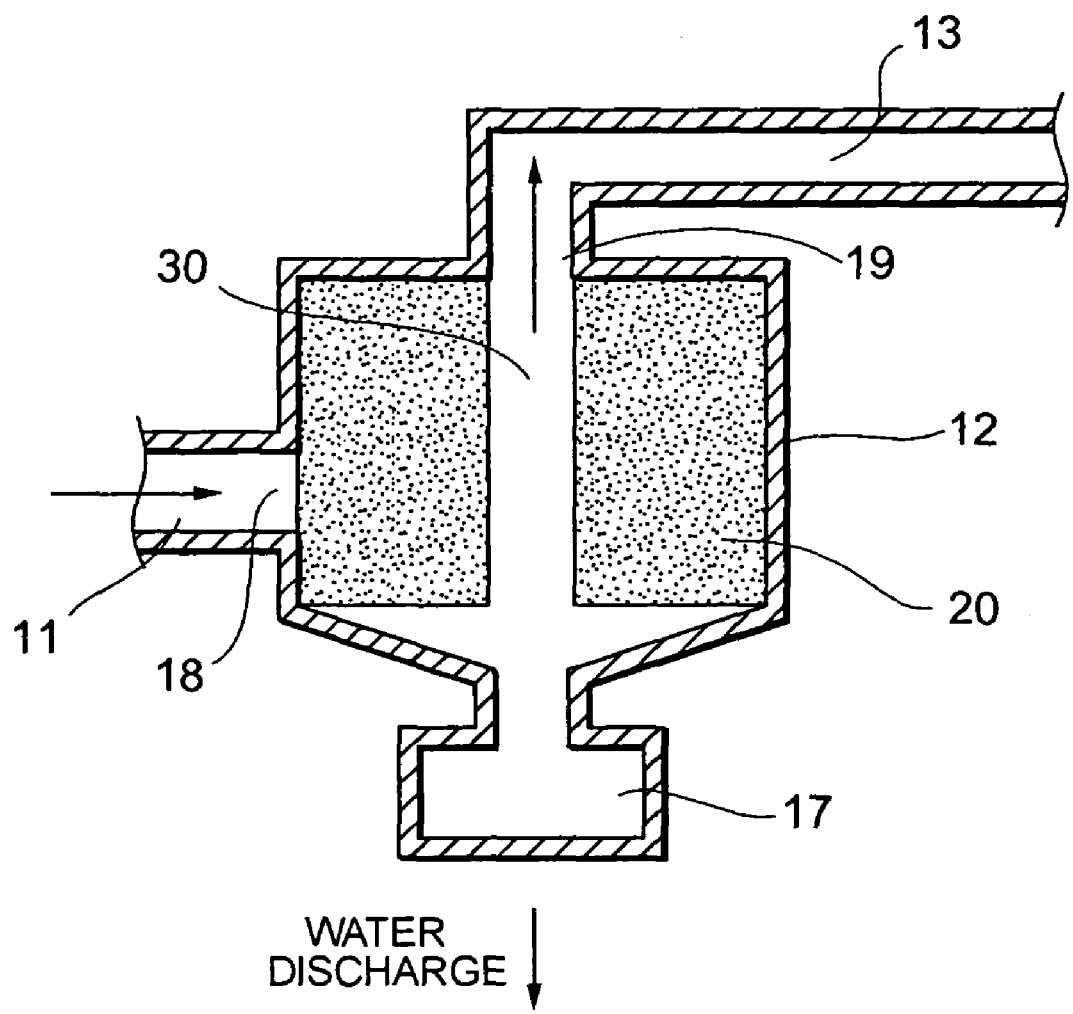
FIG. 3 is an enlarged cross-sectional view schematically showing the configuration of the area around a gas-liquid separator and an ion exchange resin member of a fuel cell system according to another embodiment of the invention.

For example, as shown in FIG. 3, a space 30 that is open and extends from the lower part of the gas-liquid separator 12 to the upper part thereof and is connected to the circulation passage 13 may be formed in the approximate central part of the ion exchange resin member 20. It is possible to efficiently prevent the generation of pressure loss by forming the space 30 in this way.

Figure 4:
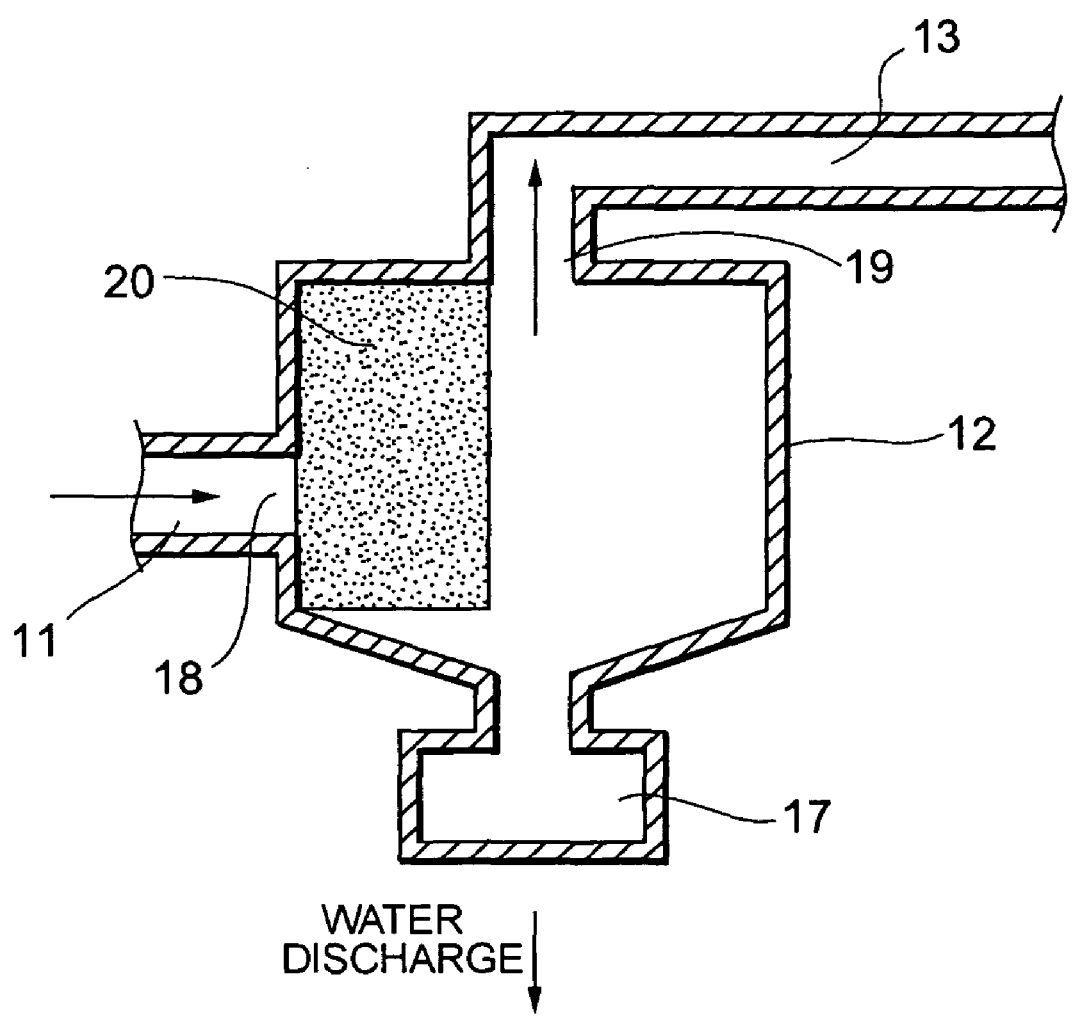
FIG. 4 is an enlarged cross-sectional view schematically showing the configuration of the area around a gas-liquid separator and an ion exchange resin member of a fuel cell system according to a further embodiment of the invention.

In another embodiment of the invention as shown in FIG. 4, the ion exchange resin member 20 may be placed in contact with the inside wall of the gas-liquid separator 12 where the gas-liquid inlet 18 is formed, so that it covers the gas-liquid inlet 18.

Figure 5:
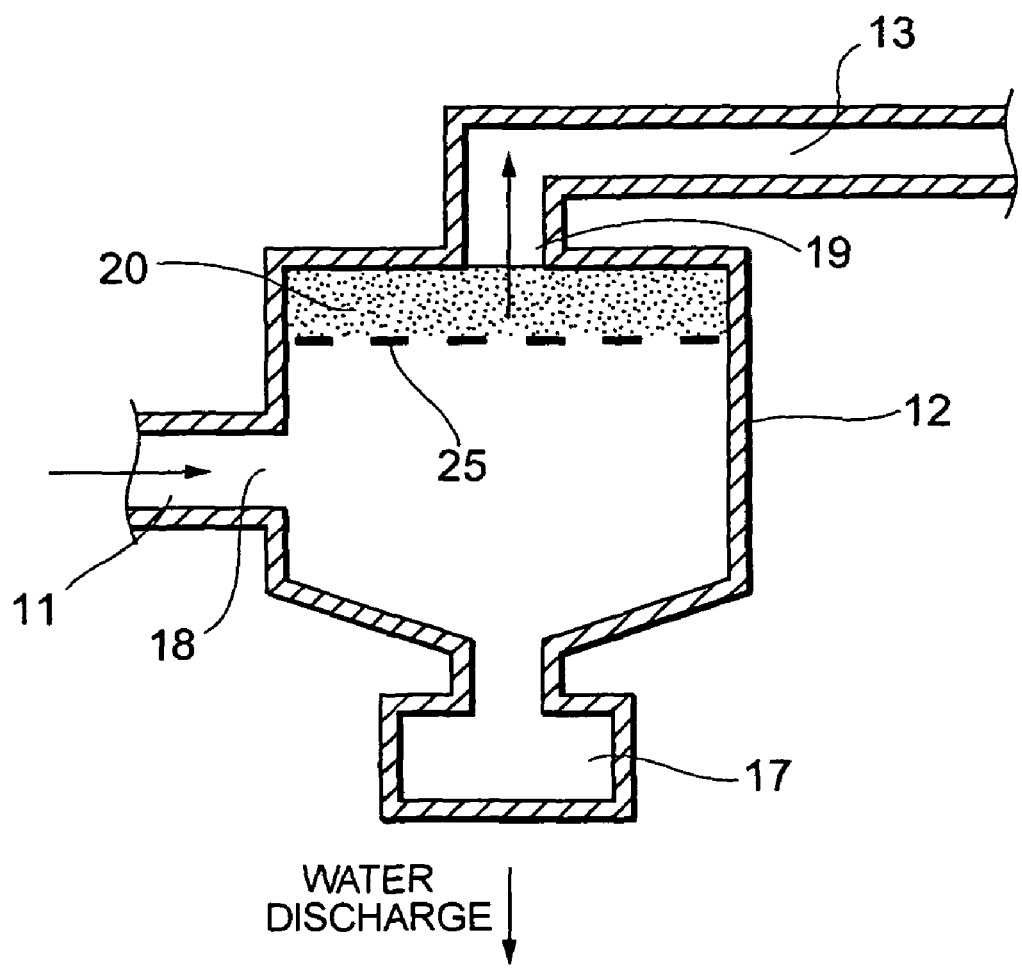
FIG. 5 is an enlarged cross-sectional view schematically showing the configuration of the area around a gas-liquid separator and an ion exchange resin member of a fuel cell system according to a yet further embodiment of the invention.

Furthermore, as shown in FIG. 5, the ion exchange resin member 20 may be placed in contact with the inside wall of the gas-liquid separator 12 where the gas outlet 19 is formed. Also, a water-repellent film 25 may be applied to the lower surface of the ion exchange resin member 20, that is, the outside surface of the ion exchange resin member 20 facing the water exhaust port 17. By placing the water-repellent film 25 over the ion exchange resin member 20 in this manner, any moisture that the gas-liquid separator 12 fails to remove is actively trapped by this water-repellent film 25. The moisture trapped by the water-repellent film 25 is then discharged from the water exhaust port 17. When this happens, even if the impurity components pass through the water-repellent film 25, the impurity components reach the ion exchange resin member 20 and are securely trapped and removed there.

Figure 6:
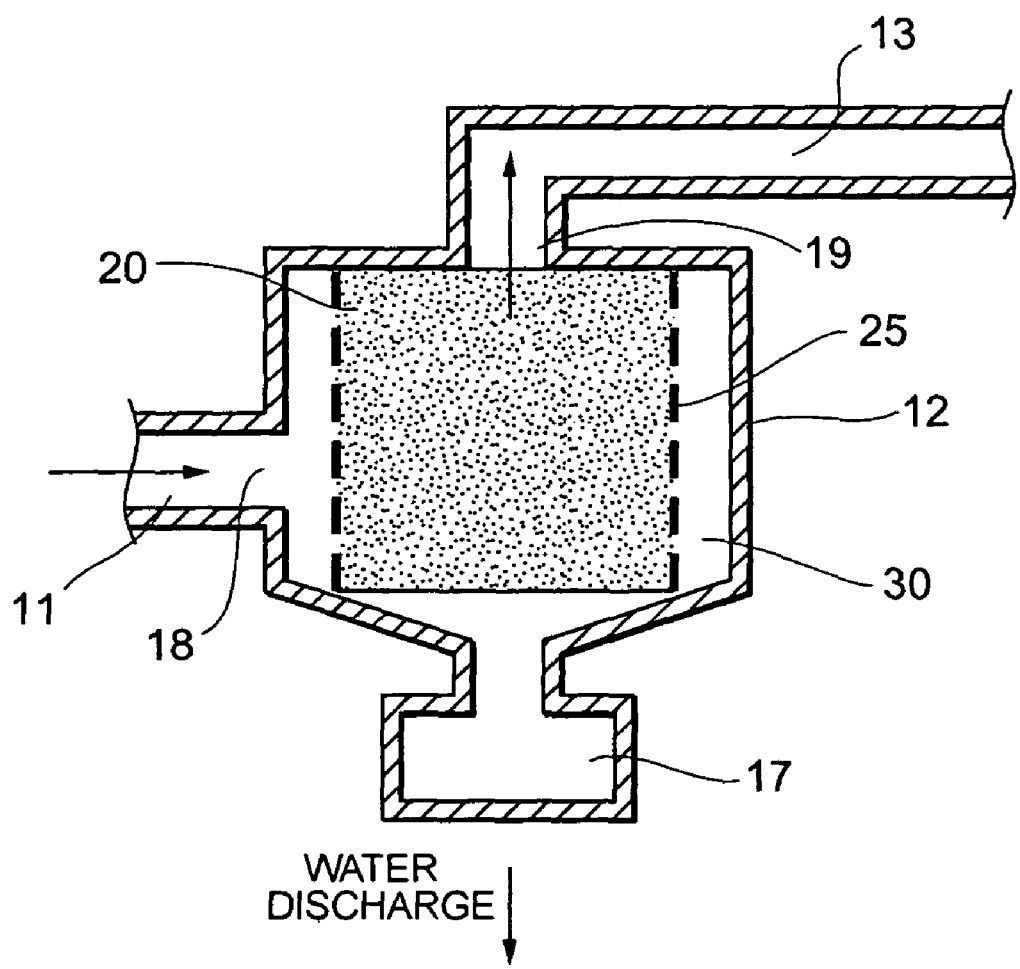
FIG. 6 is an enlarged cross-sectional view schematically showing the configuration of the area around a gas-liquid separator and an ion exchange resin member of a fuel cell system according to a still further embodiment of the invention.

In a further embodiment of the invention as shown in FIG. 6, the ion exchange resin member 20 may be placed so that it extends from a position close to the bottom of the gas-liquid separator 12 to the top thereof and a space 30 is formed between the inside wall of the gas-liquid separator 12 and the outside surface of the ion exchange resin member 20. In this case, the water-repellent film 25 may be applied to the outside surface of the ion exchange resin member 20. Because of the existence of the space 30 in this configuration, the contact area where the fluid entering through the gas-liquid inlet 18 comes into contact with the ion exchange resin member 20 is equivalent to the outside surface area. of the ion exchange resin member 20, so a large inflow area is provided when the fluid flows into the ion exchange resin member 20. Therefore, it is possible to further reduce pressure loss and further enhance refinement (or purification) efficiency.

Figure 7:
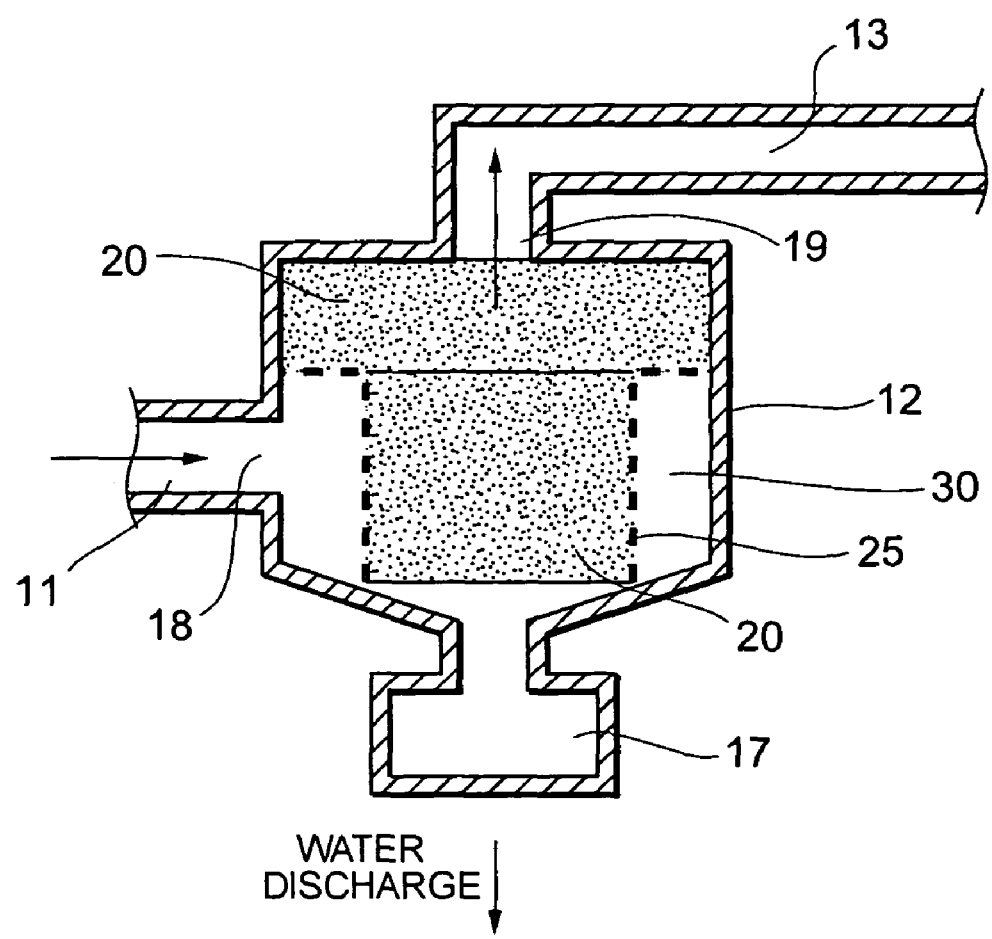
FIG. 7 is an enlarged cross-sectional view schematically showing the configuration of the area around a gas-liquid separator and an ion exchange resin member of a fuel cell system according to a further embodiment of the invention.

In a yet further embodiment of the invention as shown in FIG. 7, the ion exchange resin member 20 may be first placed in the gas-liquid separator 12 in contact with the inside wall of the gas-liquid separator 12 where the gas outlet 19 is formed, and a second block of the ion exchange resin member 20 may also be placed under and connected with the first block of the ion exchange resin member 20 placed as described above, so that the second block of the ion exchange resin member 20 reaches down to a position close to the bottom of the gas-liquid separator 12 and a space 30 is formed between the inside wall of the gas-liquid separator 12 and the outside surface of the ion exchange resin member 20. In this case as well, the water-repellent film 25 may be applied to the outside surface of the ion exchange resin member 20.

Figure 8:
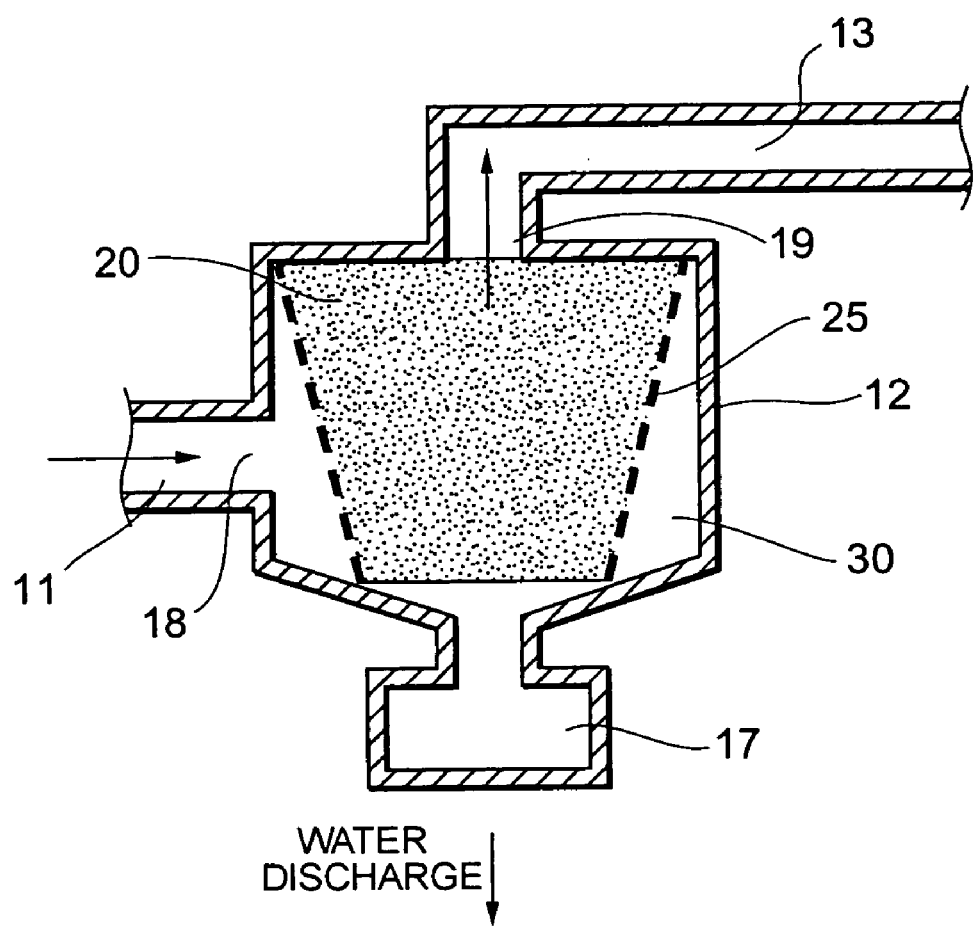
FIG. 8 is an enlarged cross-sectional view schematically showing the configuration of the area around a gas-liquid separator and an ion exchange resin member of a fuel cell system according to a further embodiment of the invention.

Furthermore, as shown in FIG. 8, the ion exchange resin member 20 may be placed so that its cross-section has a generally trapezoidal shape whose one side located at the upper part of the gas-liquid separator 12 is long and the opposite side located at the lower part of the gas-liquid separator 12 is short, and a space 30 is formed between the inside wall of the gas-liquid separator 12 and the outside surface of the ion exchange resin member 20. This configuration can increase a flow resistance (a resistance caused when a gas passes) the closer it is to the gas outlet 19 of the gas-liquid separator 12, and it is possible to prevent the gas from flowing intensively around the gas outlet 19. In this case as well, the water-repellent film 25 may be applied to the outside surface of the ion exchange resin member 20.

Figure 9:
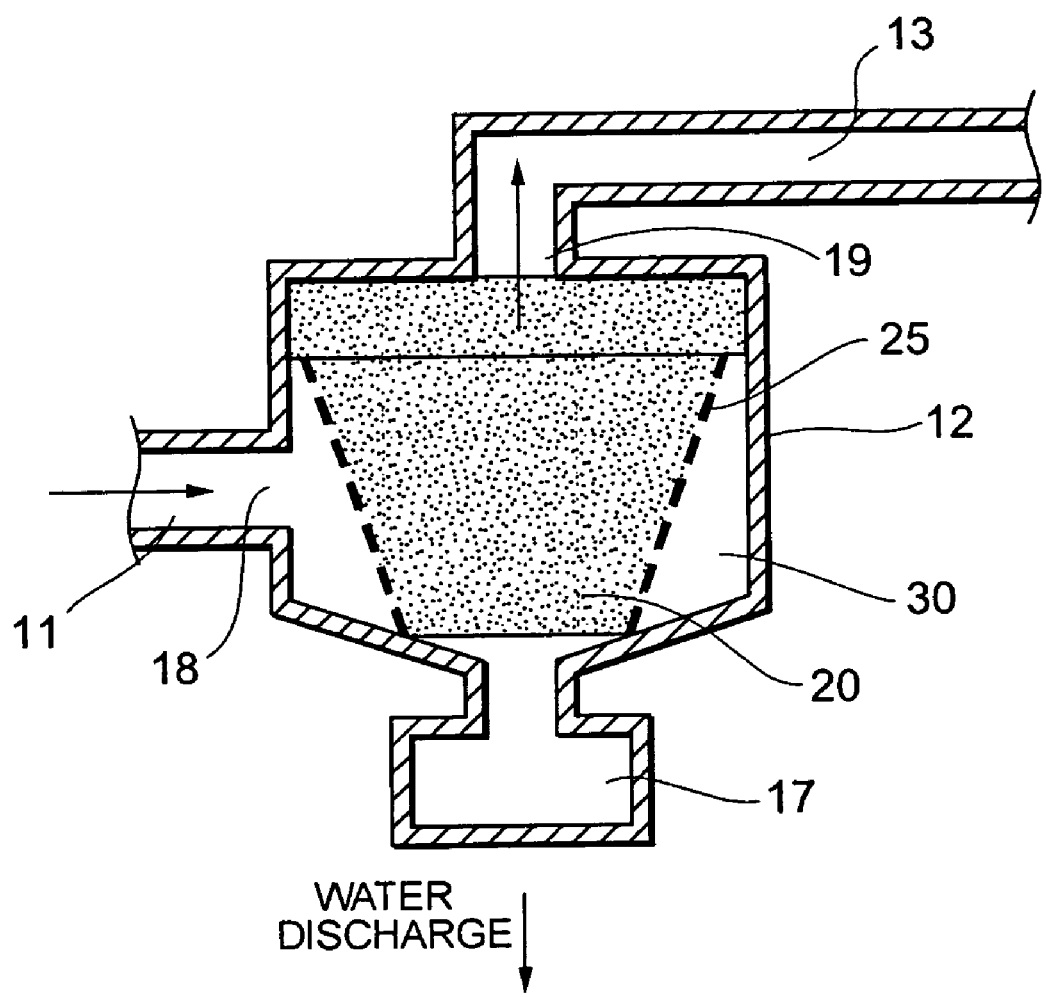
FIG. 9 is an enlarged cross-sectional view schematically showing the configuration of the area around a gas-liquid separator and an ion exchange resin member of a fuel cell system according to a further embodiment of the invention.

Furthermore, as shown in FIG. 9, the ion exchange resin member 20 may be first placed in the gas-liquid separator 12 in contact with the inside wall of the gas-liquid separator 12 where the gas outlet 19 is formed, and a second block of the ion exchange resin member 20 may also be formed under and connected to the first block of the ion exchange resin member 20 in such a manner that its cross-section has a generally trapezoidal shape whose one side located at the upper part of the gas-liquid separator 12 is long and the opposite side located at the lower part of the gas-liquid separator 12 is short, and a space 30 is formed between the inside wall of the gas-liquid separator 12 and the outside surface of the ion exchange resin member 20. This configuration can increase a flow resistance the closer it is to the gas outlet 19 of the gas-liquid separator 12, and it is possible to prevent the gas from flowing intensively around the gas outlet 19. In this case as well, the water-repellent film 25 may be applied to the outside surface of the ion exchange resin member 20.

Figure 10:
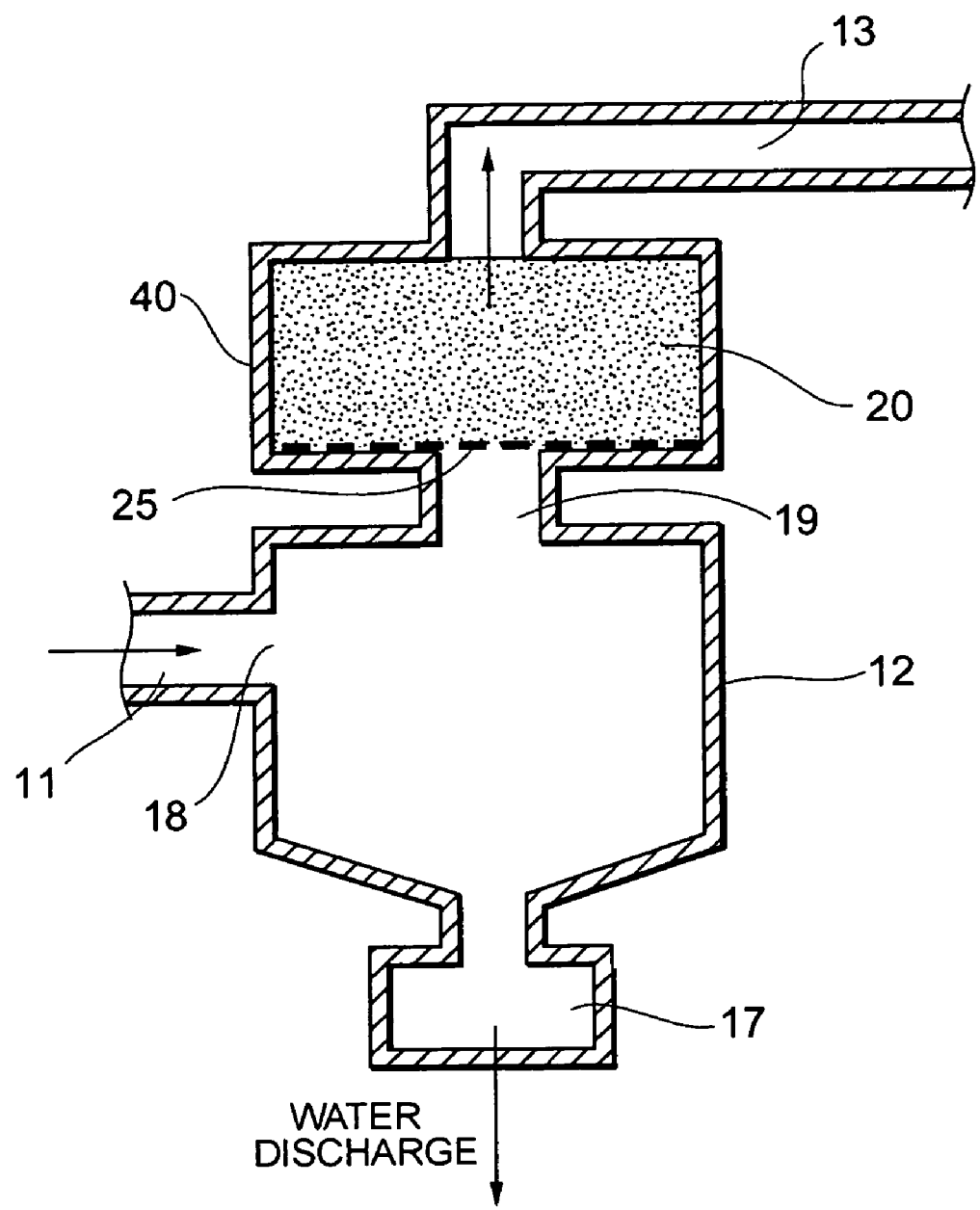
FIG. 10 is an enlarged cross-sectional view schematically showing the configuration of the area around a gas-liquid separator and an ion exchange resin member of a fuel cell system according to a further embodiment of the invention.

In a further embodiment of the invention as shown in FIG. 10, an ion exchange resin member container 40 may be formed downstream from and connected to the gas-liquid separator 12, and the ion exchange resin member 20 may be placed in this ion exchange resin member container 40. The gas-liquid separator 12 and the ion exchange resin member container 40 may be positioned close to each other or separated from each other to a certain extent. In this case as well, the water-repellent film 25 may be applied to the outside surface of the ion exchange resin member 20.

Figure 11:
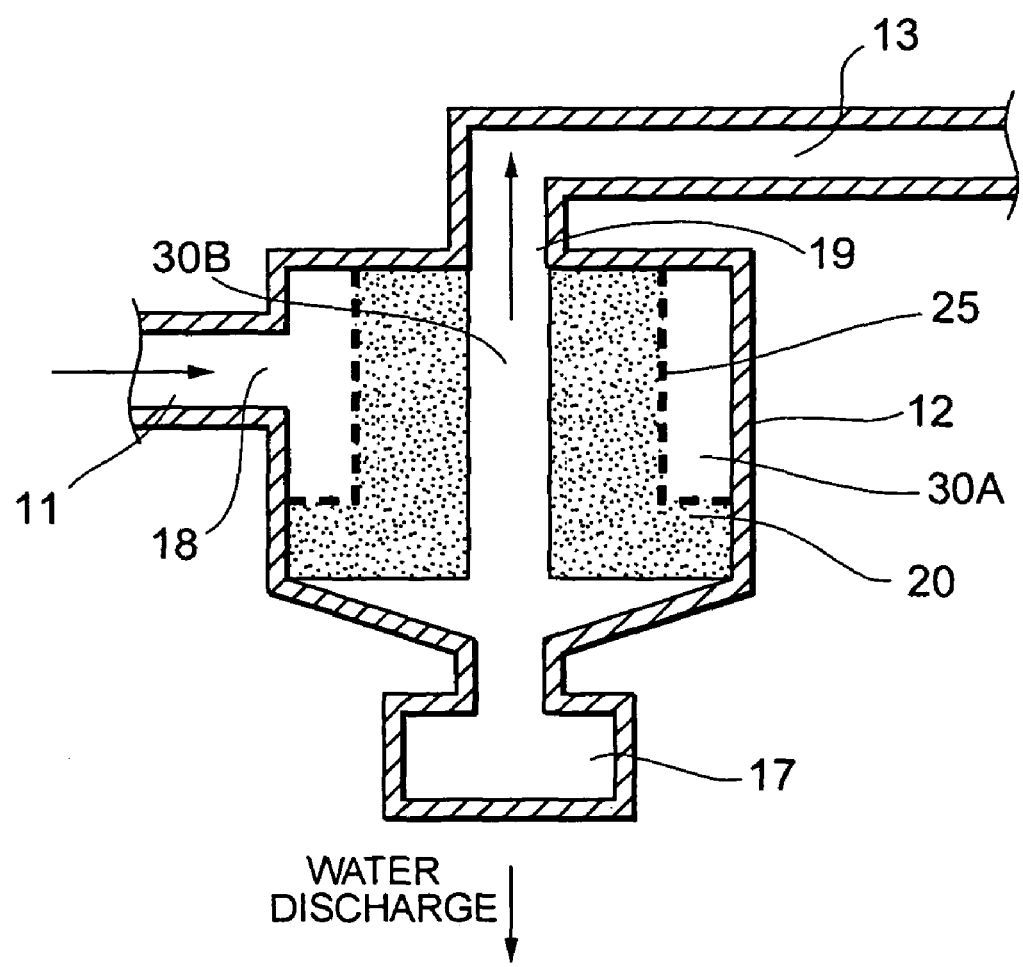
FIG. 11 is an enlarged cross-sectional view schematically showing the configuration of the area around a gas-liquid separator and an ion exchange resin member of a fuel cell system according to a further embodiment of the invention.

As shown in FIG. 11, a space 30A may be formed between the inside wall of the gas-liquid separator 12 and the outside surface of the upper part of the ion exchange resin member 20, and a space 30B may be formed in the approximate central part of the ion exchange resin member 20 so that the space 30B is open and extends from the lower part of the gas-liquid separator 12 to the upper part thereof and is connected to the circulation passage 13. This configuration can further reduce pressure loss. Incidentally, the water-repellent film 25 may be applied to the surface of the ion exchange resin member 20 opposite the inside wall of the gas-liquid separator 12.

Figure 12:
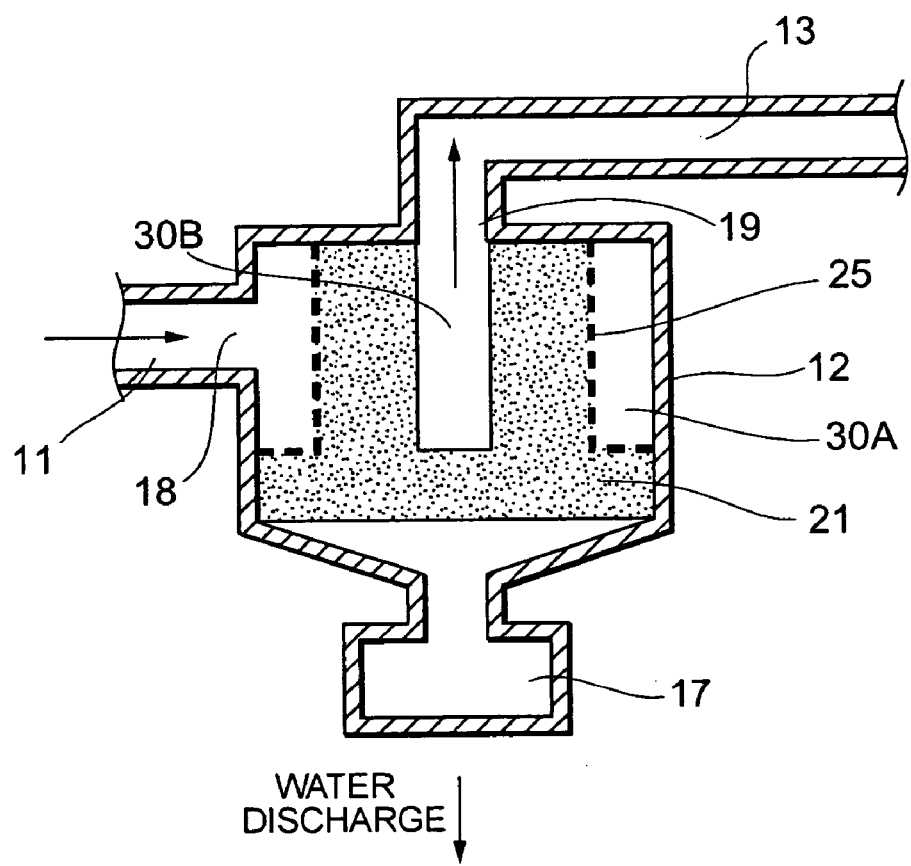
FIG. 12 is an enlarged cross-sectional view schematically showing the configuration of the area around a gas-liquid separator and an ion exchange resin member of a fuel cell system according to a further embodiment of the invention.

Moreover, as shown in FIG. 12, a space 30A may be formed between the inside wall of the gas-liquid separator 12 and the outside surface of the upper part of the ion exchange resin member 20, and a space 30B may be formed in the approximate central part of the ion exchange resin member 20 so that the space 30B is open and extends from the midsection of the ion exchange resin member 20 to the upper part thereof, leaving the lower part of the ion exchange resin member 20 unopened, and the space 30B is connected to the circulation passage 13. This configuration can further reduce pressure loss. Incidentally, the water-repellent film 25 may be applied to the surface of the ion exchange resin member 20 opposite the inside wall of the gas-liquid separator 12.

Figure 13:
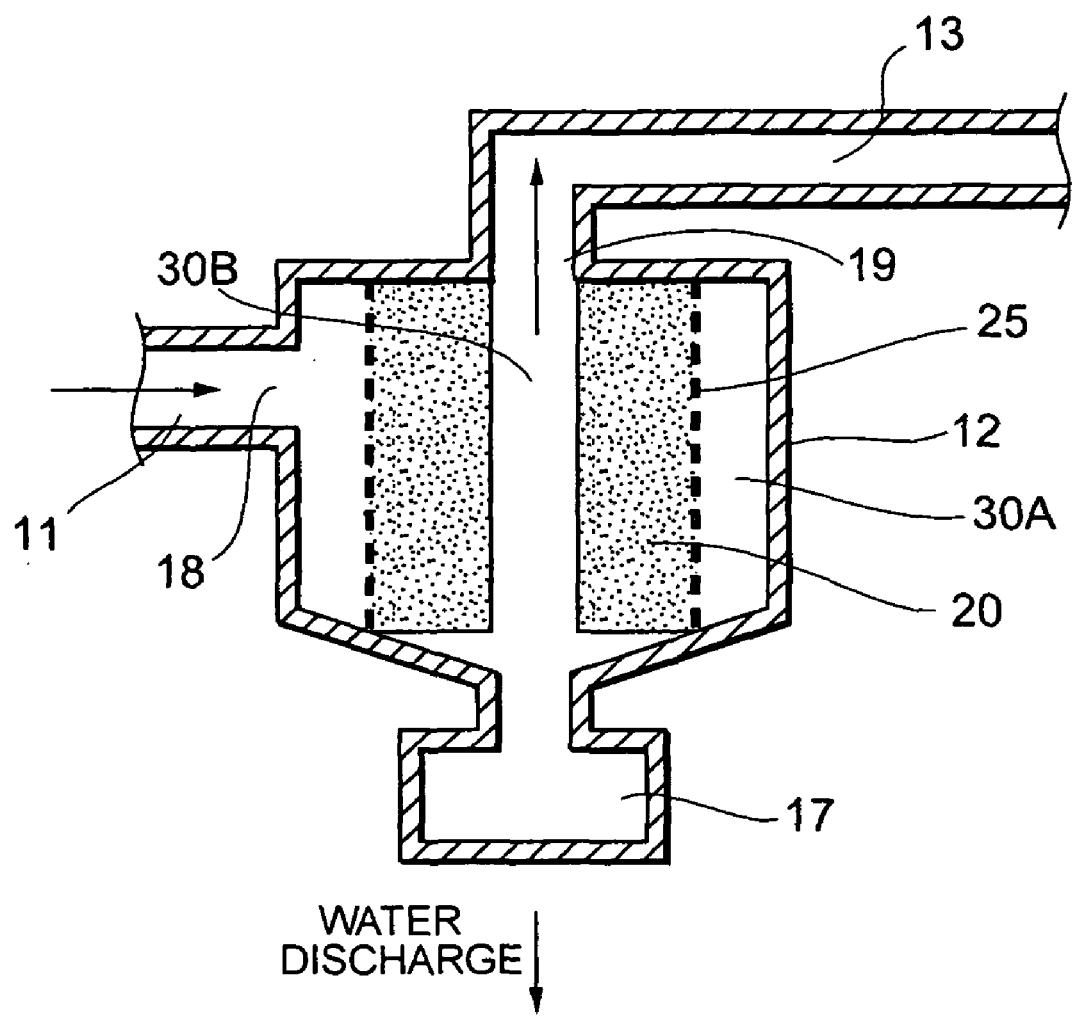
FIG. 13 is an enlarged cross-sectional view schematically showing the configuration of the area around a gas-liquid separator and an ion exchange resin member of a fuel cell system according to a further embodiment of the invention.

Furthermore, as shown in FIG. 13, a space 30A may be formed between the inside wall of the gas-liquid separator 12 and the outside surface of the ion exchange resin member 20, and a space 30B may be formed in the approximate central part of the ion exchange resin member 20 so that the space 30B is open and extends from the lower part of the gas-liquid separator 12 to the upper part thereof and is connected to the circulation passage 13. This configuration can further reduce pressure loss. Incidentally, the water-repellent film 25 may be applied to the surface of the ion exchange resin member 20 opposite the inside wall of the gas-liquid separator 12.

Figure 14:
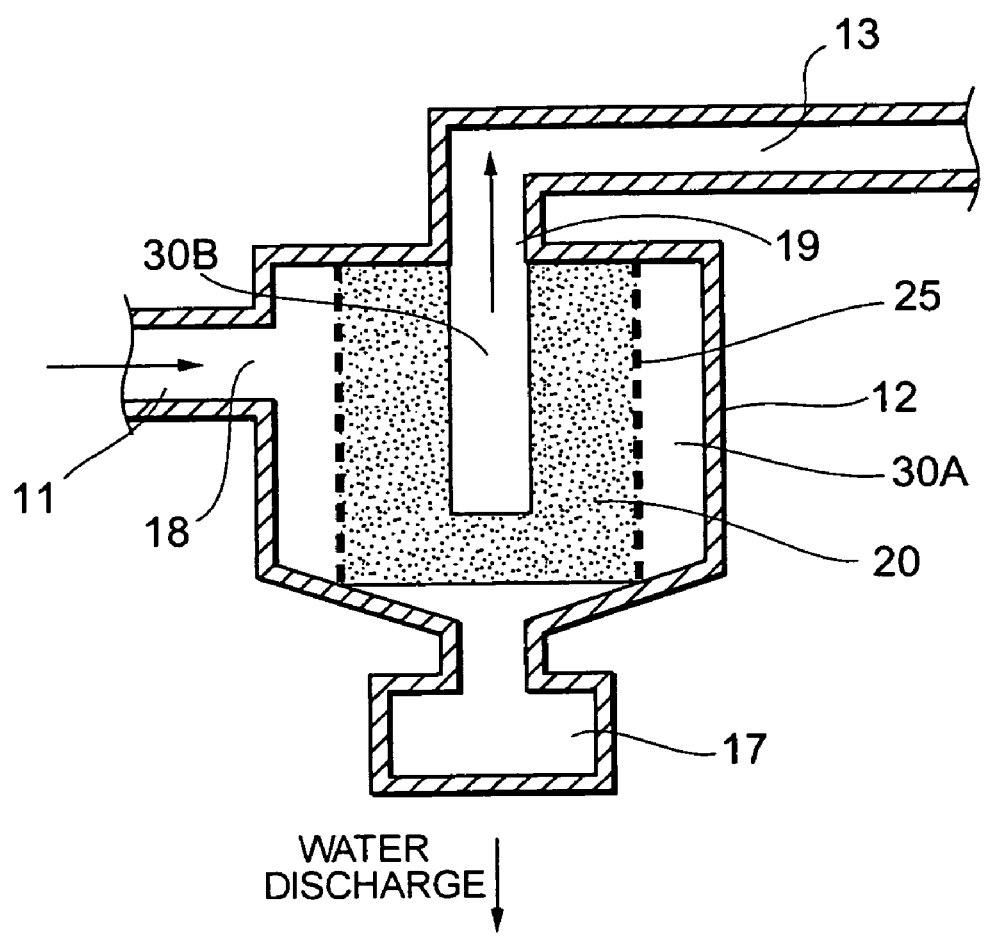
FIG. 14 is an enlarged cross-sectional view schematically showing the configuration of the area around a gas-liquid separator and an ion exchange resin member of a fuel cell system according to a further embodiment of the invention.

As shown in FIG. 14, a space 30A may be formed between the inside wall of the gas-liquid separator 12 and the outside surface of the ion exchange resin member 20, and a space 30B may be formed in the approximate central part of the ion exchange resin member 20 so that the space 30B is open and extends from the midsection of the ion exchange resin member 20 to the upper part thereof, leaving the lower part of the ion exchange resin member 20 unopened, and the space 30B is connected to the circulation passage 13. This configuration can further reduce pressure loss. Incidentally, the water-repellent film 25 may be applied to the surface of the ion exchange resin member 20 opposite the inside wall of the gas-liquid separator 12.

Also, a space 30B that is open from the lower part of the gas-liquid separator 12 to the upper part thereof and connected to the circulation passage 13, or a space 30B that is open and extends from the midsection of the ion exchange resin member 20 to the upper part thereof, leaving the lower part of the ion exchange resin member 20 unopened, and is connected to the circulation passage 13 may be formed in the approximate central part of the ion exchange resin member 20 in the shapes shown in FIGS. 8 and 9.

This embodiment described the case where an ion exchange resin in a resin case (not shown) as the ion exchange resin member 20 is placed at a specified position, and the water-repellent film 25 is applied to the outside surface of the ion exchange resin member 20 as necessary. However, the configuration of the ion exchange resin member 20 is not limited to that described above, and the ion exchange resin member 20, which is composed of only an ion exchange resin or the ion exchange resin in the resin case, may be put in a container such as a bag made of the water-repellent film 25.

Moreover, this embodiment described the case where the ion exchange resin member 20 and the water-repellent film 25 are placed in the hydrogen circulation system 10. However, there are no particular limitations on the configuration of the fuel cell system 1, and the ion exchange resin member 20 and the water-repellent film 25 may be placed in the oxygen circulation system. Also, the ion exchange resin member 20 and the water-repellent film 25 may be placed in both the hydrogen circulation system 10 and the oxygen circulation system.

Figure 15:
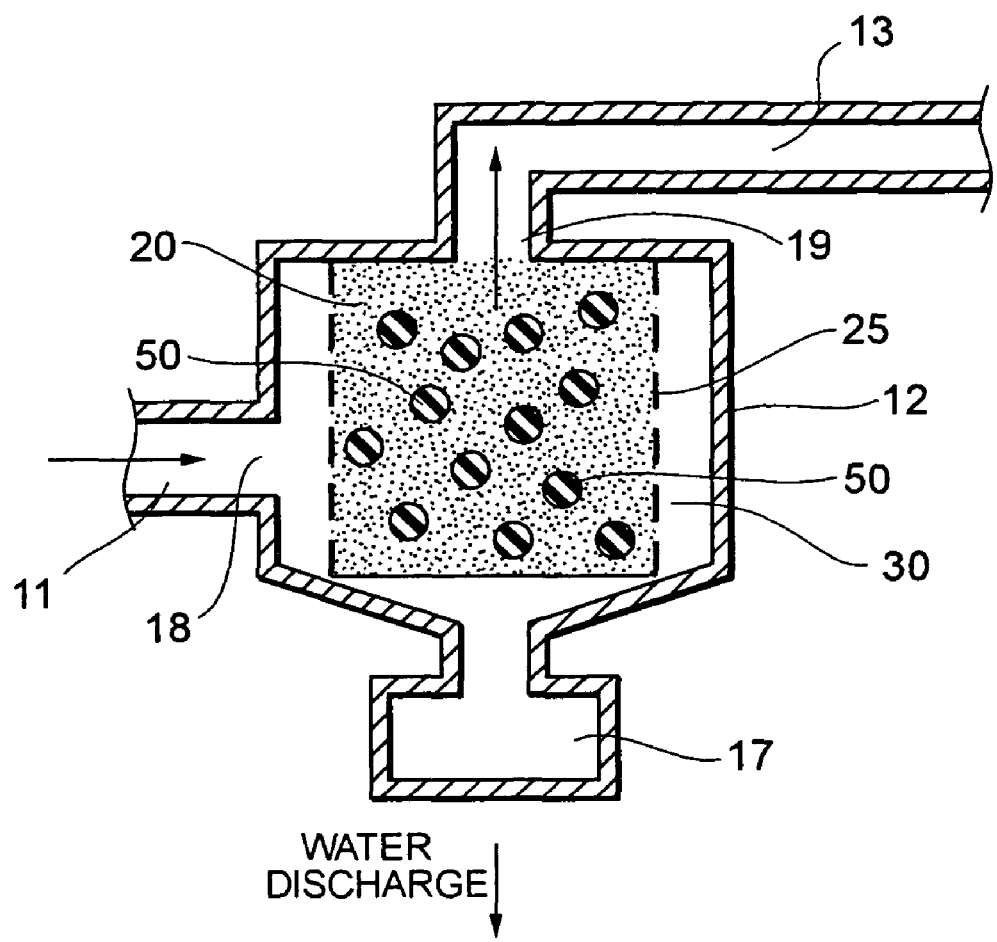
FIG. 15 is an enlarged cross-sectional view schematically showing the configuration of the area around a gas-liquid separator and an ion exchange resin member of a fuel cell system according to a further embodiment of the invention.

In a further embodiment of the invention as shown in FIG. 15, a plurality of porous sponge materials 50 can be distributed in the ion exchange resin member 20 as accommodating members. If the plural sponge materials 50 are distributed in the ion exchange resin member 20 as described above, even if the volume of the ion exchange resin member 20 changes due to expansion or contraction, the sponge materials 50 can respond to and absorb the volume changes. Accordingly, it is possible to prevent the generation of a gap between the water-repellent film 25 and the ion exchange resin member 20 and also prevent the water-repellent film 25 from being compressed by the ion exchange resin member 20.

Since a plurality of sponge materials 50 are distributed in the ion exchange resin member 20, they can uniformly absorb almost all changes in the volume of the entire ion exchange resin member 20. Moreover, since the sponge materials 50 are soft, even if the sponge materials 50 collide with the ion exchange resin member, there will be no problem.

Since the sponge materials 50 can let gas pass through, they do not interrupt the gas flow in the gas-liquid separator 12. Moreover, the sponge materials 50 can temporarily hold (or be impregnated with) moisture and make the held moisture dribble down to the water exhaust port 17, thereby efficiently discharging the moisture. Accordingly, the gas-liquid separation function can be further enhanced.

Incidentally, it is a matter of course that the sponge materials 50 can also be placed in the ion exchange resin member 20 without the water-repellent film 25. In this case, it is possible to prevent the generation of a gap between the resin case (not shown) containing the ion exchange resin member 20, and the ion exchange resin member 20, and also prevent the resin case from being compressed by the ion exchange resin member 20. If the ion exchange resin member 20 is placed in contact with the inside wall of the gas-liquid separator 12 as shown in FIGS. 2 to 5, it is possible to prevent the generation of a gap between the inside wall of the gas-liquid separator 12 and the ion exchange resin member 20, and also prevent the inside wall of the gas-liquid separator 12 from being compressed by the ion exchange resin member 20.

Figure 16:
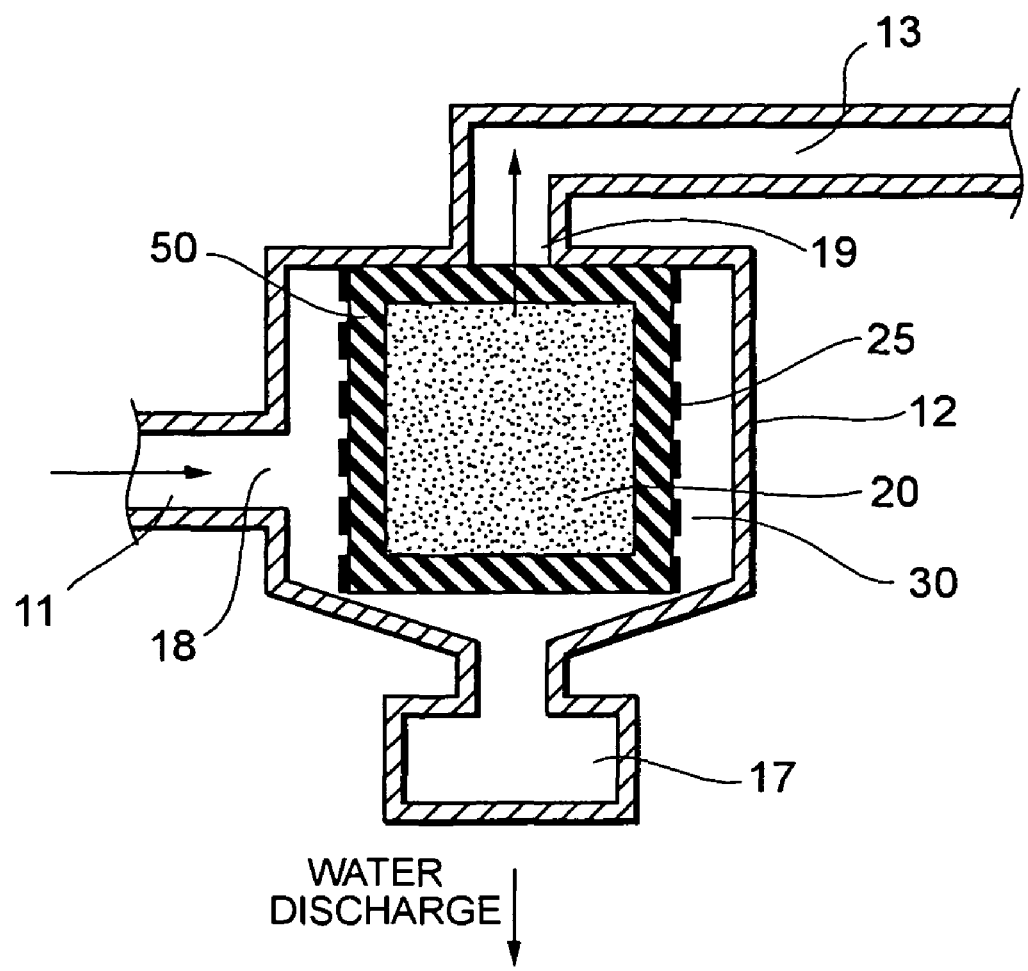
FIG. 16 is an enlarged cross-sectional view schematically showing the configuration of the area around a gas-liquid separator and an ion exchange resin member of a fuel cell system according to a further embodiment of the invention.

In a further embodiment of the invention as shown in FIG. 16, a sponge material 50 can be placed around the outside surfaces of the ion exchange resin member 20 as an accommodating member. In this case as well, even if the volume of the ion exchange resin member 20 changes due to expansion or contraction, the sponge material 50 can respond to and absorb the volume changes. Therefore, it is possible to prevent the generation of a gap between the water-repellent film 25 and the ion exchange resin member 20, and also prevent the water-repellent film 25 from being compressed by the ion exchange resin member 20.

Incidentally, it is a matter of course that the sponge material 50 can be placed around the outside surface(s) of the ion exchange resin member 20 without the water-repellent film 25. In this case too, the same advantageous effects as those described above can be achieved.

Also, the sponge material 50 may be placed around the entire outside surfaces or only at a desired part of the ion exchange resin member 20.

Figure 17:
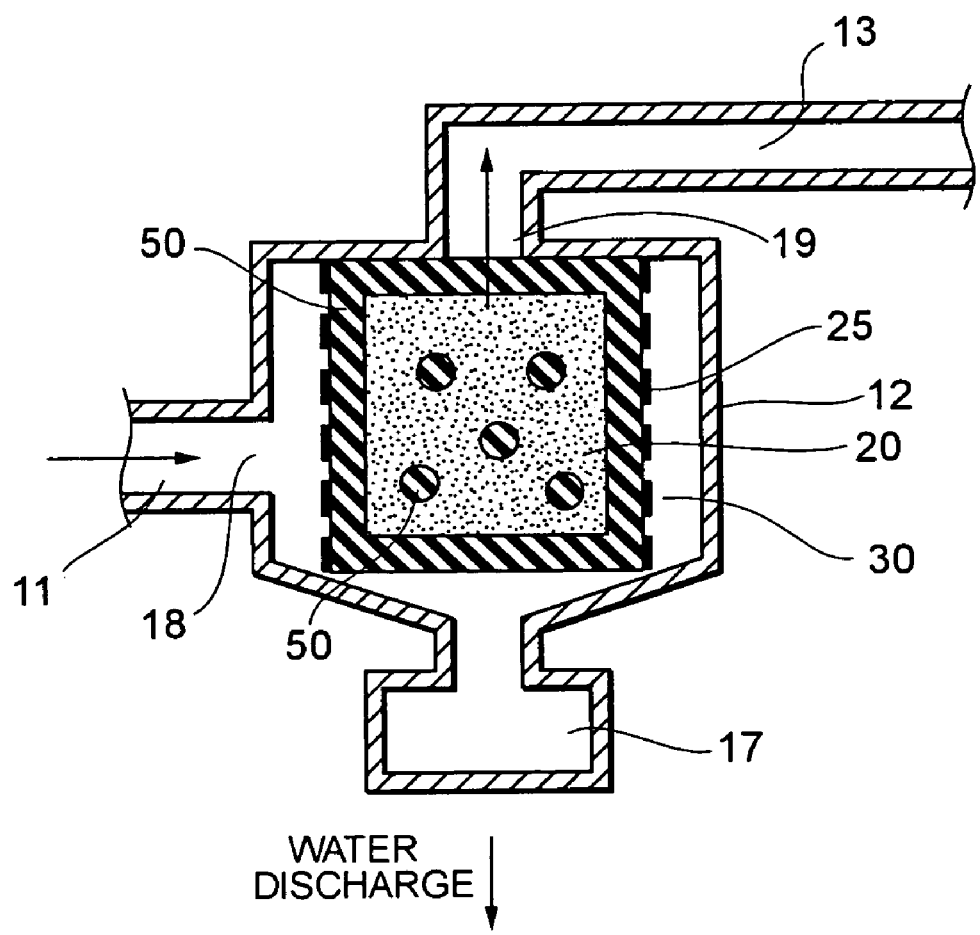
FIG. 17 is an enlarged cross-sectional view schematically showing the configuration of the area around a gas-liquid separator and an ion exchange resin member of a fuel cell system according to a further embodiment of the invention.

In a further embodiment of the invention as shown in FIG. 17, a sponge material 50 may be placed as an accommodating member around the outside surfaces of the ion exchange resin member 20, and a plurality of sponge materials 50 may also be distributed in the ion exchange resin member 20.

Figure 18:
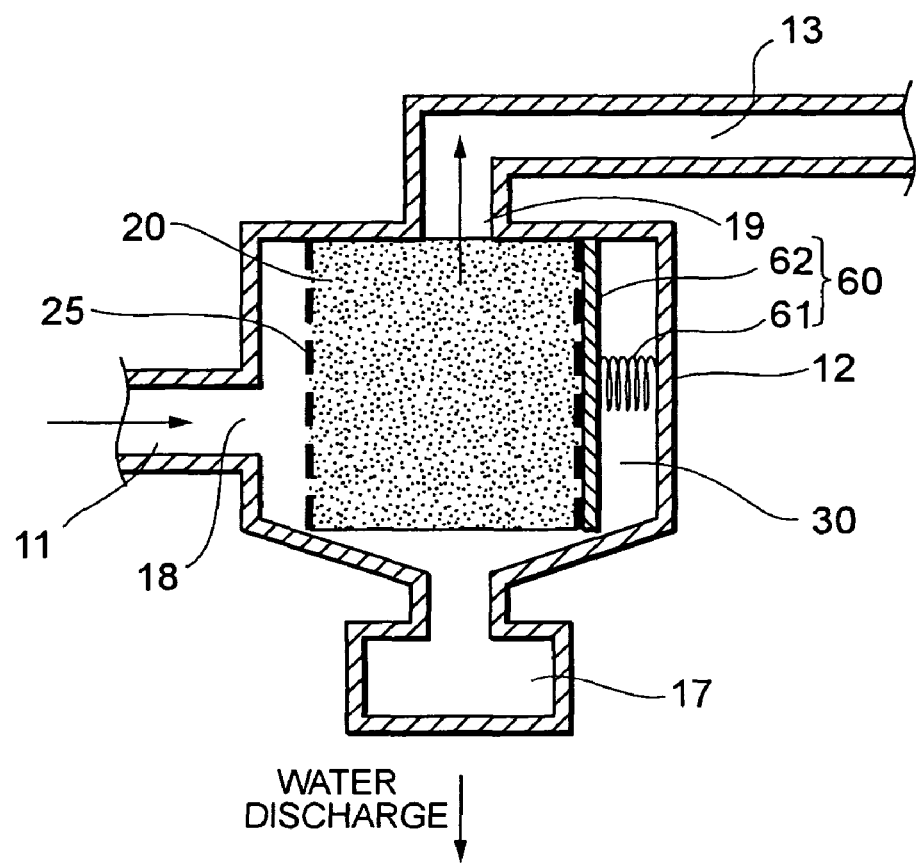
FIG. 18 is an enlarged cross-sectional view schematically showing the configuration of the area around a gas-liquid separator and an ion exchange resin member of a fuel cell system according to a further embodiment of the invention.

In a further embodiment of the invention as shown in FIG. 18, a spring member 60 may be attached as a accommodating member to the inside wall of the gas-liquid separator 12 that is positioned out of the gas-liquid flow path, that is, the inside wall opposite the gas-liquid inlet 18 in FIG. 18. The spring member 60 includes: a spring 61; and a plate member 62 to which one end of the spring 61 is secured and which can come into contact with the outside surface of the ion exchange resin member 20 opposite the gas-liquid inlet 18.

Even if the volume of the ion exchange resin member 20 changes due to expansion or contraction, the spring member 60 in the above-described configuration can respond to and absorb the volume changes. Since the spring member 60 is located at a position outside the gas-liquid flow path in the gas-liquid separator 12, interruption of the gas flow or the liquid dribbling down to the water exhaust port 17 can be prevented.

Incidentally, it is a matter of course that the spring member 60 can be applied to the ion exchange resin member 20 without the water-repellent film 25. In this case, the same advantageous effects as those described above can be achieved.

Figure 19:
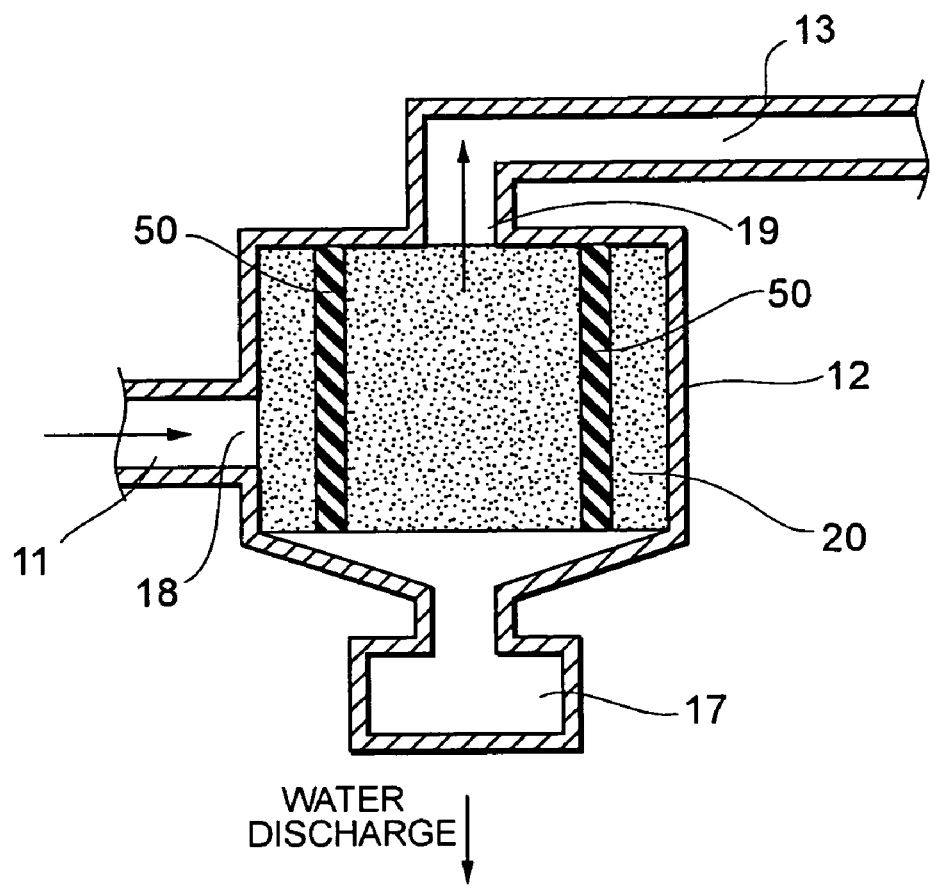
FIG. 19 is an enlarged cross-sectional view schematically showing the configuration of the area around a gas-liquid separator and an ion exchange resin member of a fuel cell system according to a further embodiment of the invention.

In a further embodiment of the invention as described in FIG. 19, a plurality of sponge materials 50 (two sponge materials 50 in FIG. 19) may be placed as accommodating members in the ion exchange resin member 20 in a vertical direction in FIG. 19.

The accommodating member is not limited to a porous material (such as the sponge materials 50), and various materials such as spring members, accordion members, rubbers, and soft resins can be used as long as they can change their own shape in response to the volume changes of the ion exchange resin member 20 without damaging the performance of the fuel cell system 1. At least one accommodating member is needed.

Figure 20:
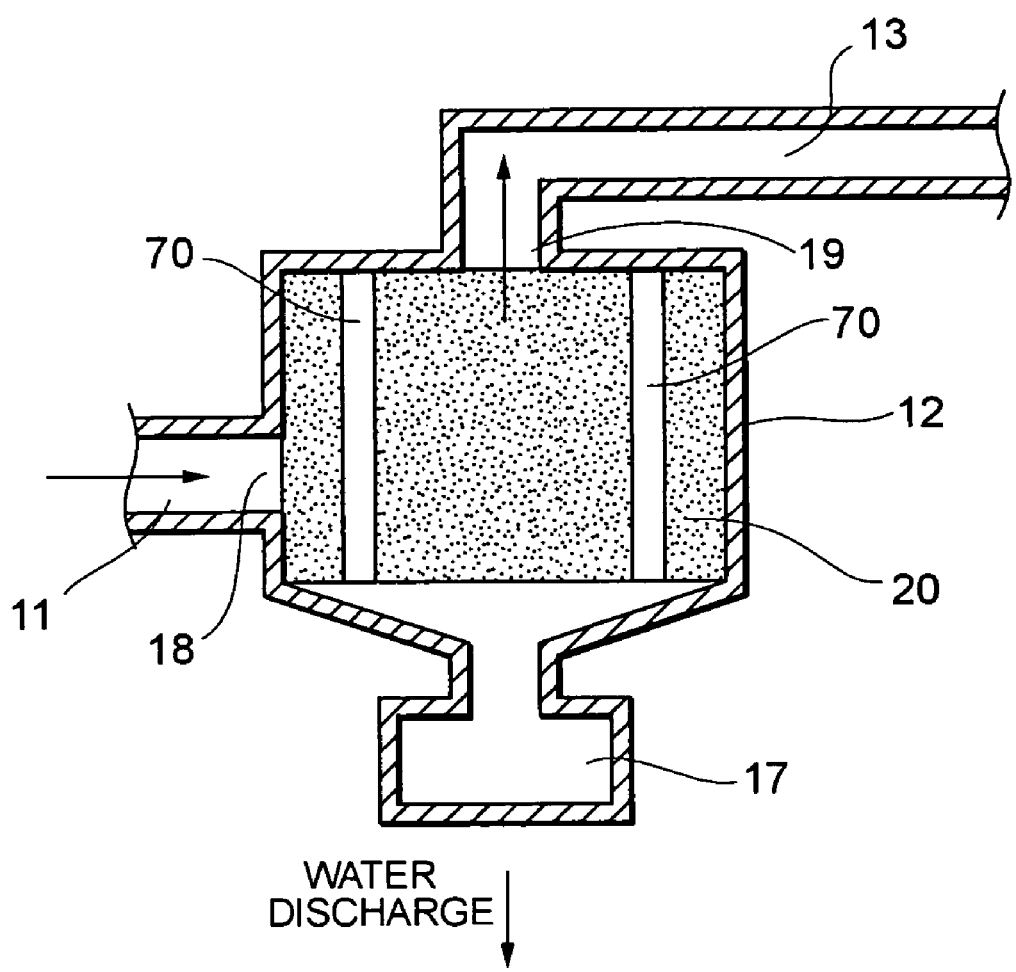
FIG. 20 is an enlarged cross-sectional view schematically showing the configuration of the area around a gas-liquid separator and an ion exchange resin member of a fuel cell system according to a further embodiment of the invention.

In a further embodiment of the invention as shown in FIG. 20, space(s) 70 capable of allowing changes in the volume of the ion exchange resin member 20 may be provided as accommodating members in the ion exchange resin member 20. Specifically speaking, when the ion exchange resin member 20 expands, the space 70 has a size allowing (or absorbing) the expansion of the ion exchange resin member 20. Therefore, the space 70 changes its shape relatively according to (or in response to) the volume changes of the ion exchange resin member 20. Incidentally, the lower end of this space 70 should preferably be open so that moisture such as the generated water does not enter the gas outlet 19.

The accommodating member described above serves to absorb the volume changes (such as expansion and contraction) of the ion exchange resin member 20 caused as a result of the operation state of the fuel cell 100. The accommodating member can change its shape according to changes (increases) in the volume of the ion exchange resin member 20 when moisture such as the generated water existing around and inside the ion exchange resin member 20 gets frozen and expands, causing the ion exchange resin member 20 to expand accordingly.

These embodiments described the case where the ion exchange resin member 20 is used as the impurity removal member. However, the impurity removal member is not limited to such an example, and any other materials (such as a foreign substance removal filter for removing foreign substances) may be utilized, as long as they can remove impurities.

These embodiments also described the circulation passage provided in the hydrogen circulation system as the exhaust gas passage for allowing the exhaust gas from the fuel cell 100 to flow through. However, the exhaust gas passage is not limited to such an example, and the exhaust gas passage may be the air exhaust passage 104. Also, there is no particular limitation on the type of the exhaust gas passage as long as the passage is used to allow the exhaust gas from the fuel cell 100 to flow through.

As described above, the fuel cell system according to the invention can securely remove the moisture particles floating in the exhaust gas passage and the impurities mixed in the moisture by using the impurity removal member. As a result, it is possible to prevent any adverse effect on the fuel cell due to the moisture and the impurities existing in the exhaust gas passage, enhance the performance of the fuel cell, and extend the service life of the fuel cell.

What is claimed is:

1. A fuel cell system comprising:
a fuel cell;
an exhaust gas passage for allowing an exhaust gas from the fuel cell to flow through;
a gas-liquid separator provided in the exhaust gas passage; and
an impurity removal member placed in the exhaust gas passage for removing impurities contained in moisture particles mixed in the exhaust gas, the impurity removal member being capable of exchanging ions, the impurity removal member being placed on the inside wall surface of the gas-liquid separator, and the impurity removal member being configured so that it increases a flow resistance the closer it is to a gas outlet of the gas-liquid separator.

2. The fuel cell system according to claim 1, wherein the impurity removal member is provided in the exhaust gas passage of a hydrogen circulation system.

3. The fuel cell system according to claim 1, wherein a gas-liquid separator is provided in the exhaust gas passage, and the impurity removal member is located downstream from the gas-liquid separator.

4. The fuel cell system according to claim 1, wherein the impurity removal member is treated to make it water-repellent.

5. The fuel cell system according to claim 4, wherein a water-repellent member is placed on the outside surface of the impurity removal member.

6. The fuel cell system according to claim 4, wherein the impurity removal member is put in a container made of a water-repellent member.

7. The fuel cell system according to claim 1, wherein the impurity removal member contains an ion exchange resin.

8. The fuel cell system according to claim 1, wherein the gas-liquid separator separates a gas-liquid mixture fluid into a gas and a liquid by swirling the gas-liquid mixture fluid.

9. The fuel cell system according to claim 7, wherein the ion exchange resin is put in a resin case with openings.

10. A fuel cell system comprising:
a fuel cell;
an exhaust gas passage for allowing an exhaust gas from the fuel cell to flow through;
an impurity removal member placed in the exhaust gas passage for removing impurities contained in moisture particles mixed in the exhaust gas, the impurity removal member is capable of exchanging ions; and
an accommodating member capable of changing its shape in response to changes in the volume of the impurity removal member.

11. The fuel cell system according to claim 10, wherein the accommodating members are distributed in the impurity removal member.

12. The fuel cell system according to claim 10, wherein the accommodating member is placed around the outside surface of the impurity removal member.

13. The fuel cell system according to claim 10, wherein the accommodating member is made of a porous material.

14. The fuel cell system according to claim 10 wherein the impurity removal member is provided inside the gas-liquid separator, and the accommodating member includes an elastic member and is located at a position outside the gas-liquid flow path of the gas-liquid separator.

15. A fuel cell system comprising:
a fuel cell;
an exhaust gas passage for allowing an exhaust gas from the fuel cell to flow through;
a gas-liquid separator provided in the exhaust gas passage;
an impurity removal member placed in the exhaust gas passage for removing impurities contained in moisture particles mixed in the exhaust gas, the impurity removal member is capable of exchanging ions, the impurity removal member being placed in such a manner that a space is formed between the inside wall surface of the gas-liquid separator and the outside surface of the impurity removal member; and
a space that is open and extends from the lower part of the gas-liquid separator to its top and connected to a circulation passage, the space being formed in the approximate central part of the impurity removal member.

* * * * *